United States Patent [19]

Ferenc et al.

[11] Patent Number: 4,962,497
[45] Date of Patent: Oct. 9, 1990

[54] BUILDING-BLOCK ARCHITECTURE OF A MULTI-NODE CIRCUIT-AND PACKET-SWITCHING SYSTEM

[75] Inventors: James J. Ferenc, Boulder, Colo.; Louis R. Goke, Austin, Tex.; Gary J. Grimes, Thornton, Colo.; Bryan S. Moffitt, Redbank, N.J.

[73] Assignee: AT&T Bell Laboratories, Murray Hill, N.J.

[21] Appl. No.: 410,774

[22] Filed: Sep. 21, 1989

[51] Int. Cl.⁵ .......................................... H04Q 11/04
[52] U.S. Cl. .................................... 370/60.1; 370/60; 370/94.1
[58] Field of Search ....................... 370/60, 60.1, 94.1, 370/68.1, 110.1, 85.1; 340/825.5

[56] References Cited

U.S. PATENT DOCUMENTS

| | | | |
|---|---|---|---|
| 3,860,761 | 1/1975 | O'Neill, Jr. | 179/18 J |
| 4,389,720 | 6/1983 | Baxter et al. | 370/62 |
| 4,488,004 | 12/1984 | Bogart et al. | 179/18 AD |
| 4,488,288 | 12/1984 | Turner | 370/60 |
| 4,530,092 | 7/1985 | Hafer | 370/66 |
| 4,535,448 | 8/1985 | Baxter et al. | 370/85 |
| 4,538,263 | 8/1985 | Gabrielli et al. | 370/85.1 |
| 4,543,653 | 9/1985 | Belforte et al. | 370/66 |
| 4,550,398 | 10/1985 | Belforte et al. | 370/66 |
| 4,556,972 | 12/1985 | Chan et al. | 370/60 |
| 4,568,930 | 2/1986 | Livingston et al. | 340/825.5 |
| 4,608,685 | 8/1986 | Jain et al. | 370/85 |
| 4,631,534 | 12/1986 | Franklin et al. | 340/825.5 |
| 4,663,758 | 5/1987 | Lambarelli et al. | 370/85.1 |
| 4,698,802 | 10/1987 | Goke et al. | 370/60 |
| 4,707,825 | 11/1987 | Amstutz et al. | 370/60 |
| 4,731,785 | 3/1988 | Ferenc et al. | 370/60 |
| 4,736,393 | 4/1988 | Grimes et al. | 375/107 |
| 4,773,067 | 9/1988 | Duxbury et al. | 370/60.1 |
| 4,809,270 | 2/1989 | Baxter et al. | 370/95 |

OTHER PUBLICATIONS

"ITT 1240 Digital Exchange," *Electrical Communication*, vol. 56. No. 2/3 (1-1-82), pp. 114-134, 148-160, 207-217.
A. Feiner, "Architecture, Design, and Development of the System 75 Office Communications System", *IEEE Journal on Selected Areas in Communications*, vol. SAC-3, No. 4 (7-85), pp. 522-530.

Primary Examiner—Douglas W. Olms
Assistant Examiner—Alpus H. Hsu
Attorney, Agent, or Firm—David Volejnicek

[57] ABSTRACT

A modular, substantially infinitely-growable, multi-node switching system operates under distributed control to serve integrated circuit-switched and packet-switched traffic at the data rates appropriate for each type of traffic. The system comprises a plurality of interconnected identical switching units that form at least one communication switching node. A communication switching node is a modular building block of the system; a switching unit is a modular building block of a switching node, and hence also of the system. A plurality of communication endpoint nodes—illustratively PBXs—is connected to the one or more switching nodes for communicating with each other through the switching nodes. A plurality of communication links each connect a different one of the system's switching units to either (a) one of the communication endpoint nodes or (b) a unit of another switching node. All of the links have the same communication format. Each switching node includes a plurality of different ones of the identical switching units, and a communication medium that interconnects all of the units of the switching node to allow each unit of a node to broadcast all communications received from a connected link to all of the units of the node.

14 Claims, 18 Drawing Sheets

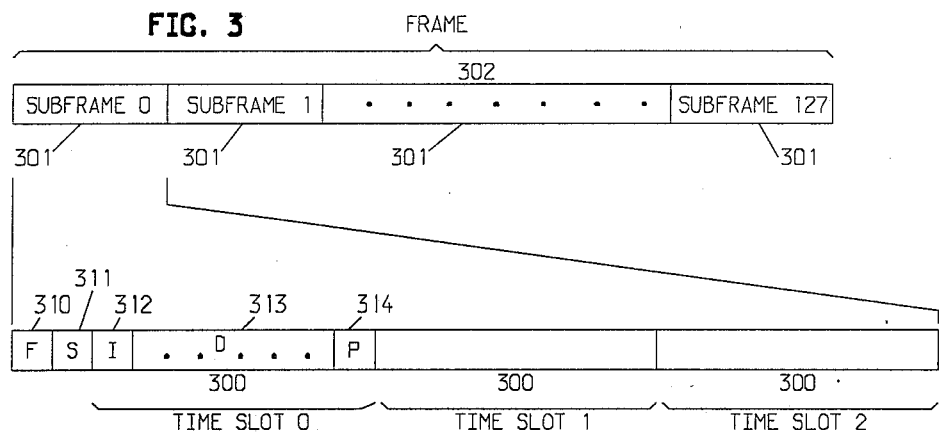
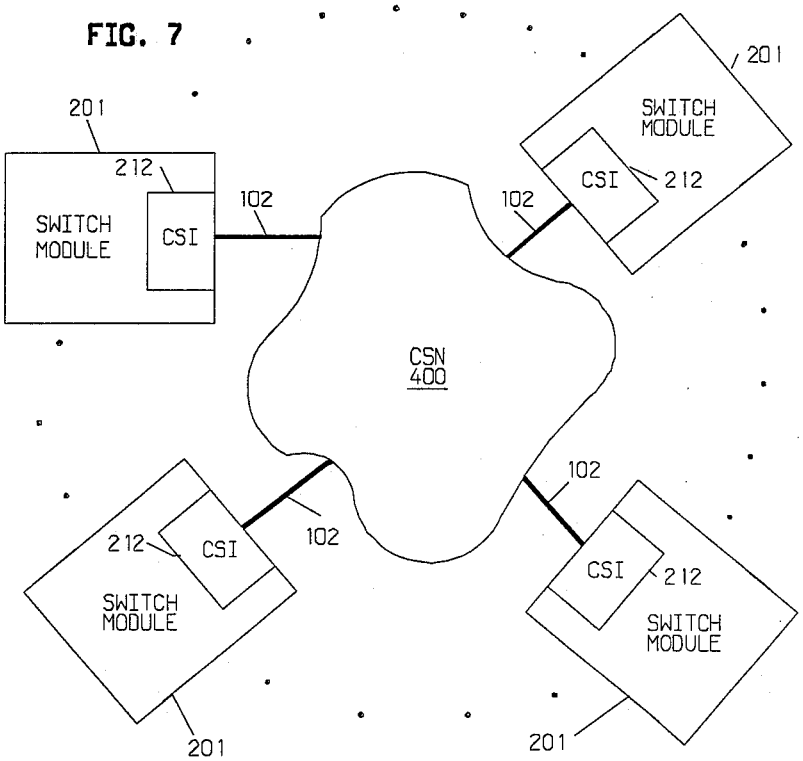

BUILDING-BLOCK ARCHITECTURE OF A MULTI-NODE CIRCUIT-AND PACKET-SWITCHING SYSTEM

TECHNICAL FIELD

This invention generally relates to the architecture of a multi-node integrated circuit- and packet-switching system, and particularly relates to the system control architecture and to the architecture of individual switching nodes and their switching units that make up the system.

CROSS-REFERENCE TO RELATED APPLICATION

A. D. Franklin and R. W. Gebhardt, "Control Architecture of a Multi-Node Circuit- and Packet-Switching System", Ser. No. 410,777, filed on Sept. 21, 1989 and assigned to the same assignee, shares herewith a substantially-identical disclosure.

BACKGROUND OF THE INVENTION

It is known that different kinds of communication traffic are advantageously switched by means of different switching techniques. For example, the characteristics of voice communications are typically most compatible with circuit-switching techniques, while the characteristics of data communications are typically most compatible with packet-switching techniques.

When faced with switching of both voice and data traffic, the art has sought to provide the best-suited switching technique for each kind of traffic within a single switching system. An example thereof is U.S. Pat. No. 4,535,448, which discloses a single-node switching system having both a time-division multiplex (TDM) bus and a packet bus. Pulse-code modulated (PCM) voice signals are circuit-switched over the TDM bus between various ports that are connected to the TDM bus, while packetized data are packet-switched over the packet bus between the ports that are connected to the packet bus.

An advantage of the dual-bus system shown in this patent is that the packet bus permits efficient bandwidth utilization and high data rates. This is in contrast to a PCM-only switching system, which allocates bandwidth in fixed increments to data connections just like it does for voice communications, and maintains those allocations for the duration of the connections irrespective of actual use of the bandwidth. Hence, the dual-bus system uses bandwidth more efficiently and obtains higher throughput rates for a given bandwidth than the PCM-only system.

While the dual bus system shown in U.S. Pat. No. 4,535,448 provides efficient circuit-switching and packet-switching service for a single-node switching system, it offers no solution to the problem of transmitting both circuit-switched voice and packet-switched data between the various nodes of a multi-node switching system wherein each node thereof comprises, e.g., a switching system of the type shown in U.S. Pat. No. 4,535,448.

Arrangements for routing circuit-switched and packet-switched traffic between the nodes of a multi-node switching system are known. For example, U.S. Pat. No. 4,556,972 discloses an arrangement that provides for such interconnection by carrying both circuit-switched and packet-switched traffic between nodes in TDM circuit-switched form. However, the inter-node packet transmission capabilities of this system are not at the high data rates characteristic of packet buses. Instead, the inter-node packet transmission rate of this system is relatively low and is limited to that of a single system time slot. The reason for this is that this system serves inter-node packet communications by breaking up an inter-node packet into bytes and then transmitting the bytes one-by-one during successive occurrences, in successive transmission frames, of a time slot to which the packet transmission is assigned. The packet bytes are combined at the receiving end and reconstituted into a complete packet.

It can be seen that the system of this patent serves inter-node packet connections in the same manner as it serves inter-node voice connections. Namely, it serves both types of connections by assigning a single time slot to each such connection and by then transmitting the voice signals or data associated with the connection between the transmitting and receiving ends via the assigned time slot during successive occurrences of the time slot. This is the same manner in which the above-mentioned PCM-only switching system handles intra-node voice and data transmissions. Consequently, the system disclosed in U.S. Pat. No. 4,556,972 fails to realize for inter-node transmissions the advantages that are offered for intra-node transmissions by the abovementioned system of U.S. Pat. No. 4,535,448.

The art has sought to introduce the advantages of high-speed packet data transfers to communication systems wherein inter-node transmissions of both circuit-switched and packetized traffic are accomplished by means of TDM facilities. For example, U.S. Pat. No. 4,731,785 discloses an arrangement for inserting circuit-switched and packetized traffic into different time slots of an inter-node TDM bus such that the circuit-switched traffic is carried by time slots of the TDM bus in a substantially conventional manner while packets are broken up into bytes and sequential bytes of a packet are inserted into sequential "idle" time slots of the TDM bus. "Idle" time slots are those that are not presently carrying circuit-switched traffic. "Idle" time slots are distinguished by the value of a special information bit that is inserted into each time slot, and which thereby specifies whether the traffic carried by the time slot represents circuit-switched or packetized traffic. The bytes of an inter-node packet may thus be carried by a plurality of time slots of a single transmission frame. This is in contrast to the system of U.S. Pat. No. 4,556,972, wherein the bytes of an inter-node packet are carried by only one time slot of a single frame. The arrangement of U.S. Pat. No. 4,731,785 thereby significantly increases the inter-node packet transmission rate to the full bandwidth of the TDM bus that is represented by the "idle" time slots.

While it does provide the requisite transmission rates for packetized traffic, U.S. Pat. No. 4,731,785 only discloses an arrangement for transporting integrated circuit-switched and packetized traffic between only two nodes. Unlike U.S. Pat. No. 4,556,972, it does not disclose a switching system network capable of interconnecting a plurality of endpoints, each one of which comprises a source of separate circuit-switched and packet-switched traffic, in a manner whereby the switching systems of the network are capable of routing individual communications, be they circuit-switched or packet-switched, to different individual ones of the endpoints. Rather, it discloses a switching network capable of interconnecting only two such endpoints and having no routing capability. And neither one of the patents offers any suggestions on how their respective advantages might be achieved within a single integrated circuit-and packet-switching network.

It is therefore a problem to provide a multi-node switching system having the capability of carrying and routing integrated inter-node circuit-switched and packet-switched traffic, with the packetized traffic being transmitted at the high data rates characteristic of packet switching systems.

A further difficulty is encountered in the area of capacity of the switching system to handle traffic growth. Traditionally, switch design has proceeded by first determining a maximum switch size, and then implementing a design that meets this size objective. Maximum designed switch size has often been based on the call-handling capacity of a feasible call control processor, and on engineered switch fabric capacity and switching bandwidth requirements. But once the switch design has been defined and the switch has been built, adding switching capacity beyond the predefined limit has been impossible, or very difficult at best.

It is therefore another problem to provide a multi-node switching system that avoids limitations on system growth, and that provides integrated circuit- and packet-switching bandwidth and capacity for as-yet unforeseen bandwidth-hungry applications and for unbounded line size growth—in other words, to provide a system that has a substantially-limitless growth architecture.

Certain switching fabric architectures do offer the possibility of substantially-limitless growth—the banyan network topology is a good example. However, most switching systems which are available today, irrespective of their switching fabric topology, are of the common control type. Common control systems, in general, comprise a switching fabric such as an array of crosspoints forming a network, and a centralized control which operates the fabric in order to establish a communication path. The centralized control typically has a maximum size expansion limit which is determined by the capacity of the control. Beyond a predetermined point, further size expansion requires replacement of the control, which generally requires total replacement by a different system. This also means that the total foreseeably-required control capacity must be provided right from the start, regardless of the line size of the system as initially implemented or put into service. Therefore, common control design is not economical for small-sized systems. And furthermore, even if the switching fabric itself is modularized and distributed, the number of control links required to connect the central control to all of the modules of a growing system quickly becomes prohibitively cumbersome and expensive.

In order to alleviate some of the problems associated with common control systems, the prior art has sought to develop control architectures that use distributed or progressive control. Distributed control systems, in general, comprise a number of switching stages which combine both control and switching in each stage. Since control and switching are provided in coordinated amounts, distributed control systems are economical at small line sizes and have virtually unlimited growth potential. Examples of distributed control systems are found in U.S. Pat. No. 3,860,761 which applies the distributed control concept to a space-division circuit switch, and in U.S. Pat. No. 4,488,288 which applies the concept to a banyan packet-switching network.

However, successful application of distributed control to other types of switches, such as time-division circuit switches and integrated circuit-and-packet switches, has heretofore been lacking. For example, a highly-touted attempt by a major international telecommunications equipment manufacturing company to develop a distributed-control TDM switch has been reported in the recent past to have failed drastically, after reported expenditures of over a billion dollars in development costs. It is therefore a further problem to provide a multi-node TDM switching system having distributed control, and particularly to provide a multi-node integrated circuit- and packet-switching system having distributed control.

SUMMARY OF THE INVENTION

The invention is directed to solving these and other problems and disadvantages of the prior art. According to the overall invention, there is provided a modular, substantially infinitely-growable, multi-node switching system, as well as the modules therefor, that operates under distributed control to serve integrated circuit-switched and packet-switched traffic at the data rates appropriate for each type of traffic.

The system comprises a plurality of interconnected identical switching units that form at least one communication node. A communication node is a modular building block of the system; a switching unit is a modular building block of a node and hence also of the system. A plurality of communication endpoints is connected to the node or nodes for communicating with each other through the node or nodes. A plurality of communication links each connect a different one of the system's switch units to either (a) one of the communication endpoints or (b) a unit of another switching node. All of the links have the same communication format. Each node includes a plurality of different ones of the identical switching units, and a communication median that interconnects all of the units of the node. In turn, each switching unit comprises a transmitting and a receiving section which are structured and function as follows.

The receiving section is connectable to either one of a communication endpoint and a unit of a switching node other than a switching node that includes the unit (e.g., through one of the links), for receiving simultaneously a plurality of multiplexed circuit- and packet-switched communications in the same format from whichever one of the endpoint and a unit of the other node it is connected to. The receiving section is further connectable to the units of the switching node (e.g., through the medium), for broadcasting all received communications to each unit within the switching node.

The transmitting section is connectable to the units of the switching node that includes the unit, and is responsive to receipt of communications broadcast by the units of the switching node that includes the unit, for determining which of the received broadcast communications are intended for receipt or retransmission by the unit and discarding all other received broadcast communications. The transmitting section responds to information included in received broadcast communications that are intended for receipt by the unit, and multiplexes together received broadcast circuit- and packet-switched communications that are received from a plurality of the units of the switching node that includes the unit and that are intended for retransmission by the unit. The transmitting section is further connectable to either one of a communication endpoint and a unit of a switching node that includes the unit, for transmitting simultaneously a plurality of circuit- and packet-switched communications multiplexed together by the multiplexing means in the same format to whichever one of the endpoint and a unit of the other node it is connected to.

Preferably the transmitting section includes a plurality of stores a different one connectable to each unit of the node that includes the unit, each for receiving and storing communications broadcast by whichever unit it is connected to. Furthermore, each store preferably stores received circuit-switched communications separately from received packet-switched communications.

The modular, or building, or building-block, switching architecture characterized above is a growable flexible hardware architecture unbounded by design constraints. A system that uses this architecture can be expanded substantially without limit by adding switching units and associated links to switching nodes, and by adding new switching nodes and links to the system. The system provides ever-increasing communication processing power as units and nodes are added. System size is not limited in size and growth by processor throughput; rather, the architecture allows for substantially unbounded system growth. System cost is directly proportional to the number of links used in the configuration of interest. In other words, the aforementioned additions increase system bandwidth at a proportional increase in cost. Furthermore, the cost of increased bandwidth can be traded off against a lowered likelihood of blocking and/or interconnection redundancy. Redundancy has the beneficial trait that link failures do not lead to disruptions of traffic, but merely to increased likelihood of blocking. Furthermore, there is no central point of control; rather, control is decentralized and each node is capable of independent operation, thereby avoiding the hazard of relying on a vulnerable central processor. Consequently, the switching components may be geographically distributed; for example, modules may be remoted.

The architecture logically implements a completely non-blocking circuit switch for switching communications such as voice and compressed video, and a self-routing packet switch for switching communications such as wide-band data and images. The building blocks are non-blocking bandwidth (e.g., time-and-space)-division switches, capable of switching any time slot incoming on any link to any time slot outgoing on any link. Hence, the system as a whole may be engineered therefrom to be either blocking or fully non-blocking. By making packets self-routing, potential performance bottlenecks in programming logical channel translations in the switching elements are avoided. Rather, all packet call set-up and tear-down activity can occur externally, e.g., at the communication endpoint nodes, and the switching hardware switch packets using an appropriate protocol, such as the LAPD link level protocol, to relieve switching system firmware and software of that burden. This keeps the switching systems a low-intelligence machine in terms of processing power, but a high-performance machine in terms of switching throughput.

Illustratively, switching nodes are implemented as multiple circuit packs plugged into a common backplane. Both circuit- and packet-switched information share link and backplane bandwidth on a dynamically-allocated basis, in contrast with the traditional approach of segregating circuit- and packet-switched communications. More efficient use of bandwidth is thereby made, and latency in inter-processor communications is minimized.

The architecture provides connectivity required for both system user and system control information transfer. Illustratively, it uses the packet-switching capability and store-and-forward technique to pass control messages through the switching system. The control network is "piggybacked" onto the system user packet-switching capability, thereby avoiding the provisioning of dedicated facilities. Priority is given to network control packets over packets carrying user traffic.

These and other features and advantages of the invention will become more apparent from the following description of an illustrative embodiment of the invention considered together with the drawing.

BRIEF DESCRIPTION OF THE DRAWING

FIG. 3 illustrates the communication format of the TDM link of the system of FIG. 2;

FIG. 7 is a block diagram of a multi-module communication system constructed from the system of FIG. 2 according to this invention;

DETAILED DESCRIPTION

Figure 1:
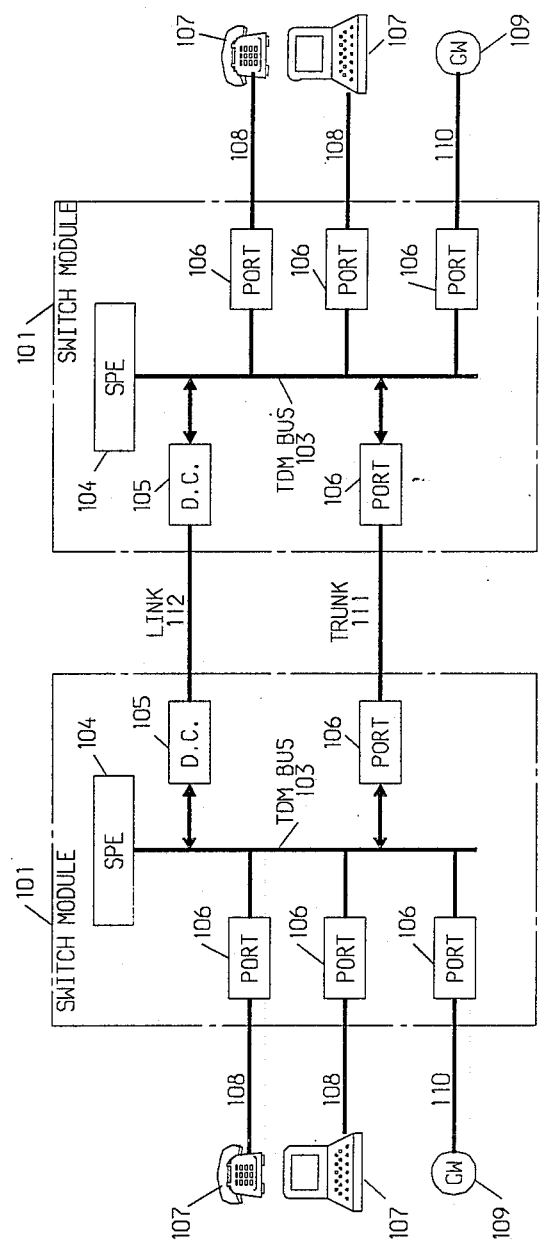
FIG. 1 is a block diagram of a prior art communication system.

FIG. 1 shows in block diagram form an existing communication system which forms a basis for an illustrative embodiment of the invention. The system of FIG. 1 comprises a pair of interconnected switch modules (SMs) 101. Each module 101 is illustrative an AT&T System 75 private branch exchange (PBX). A description of the System 75 PBX may be found in the *AT&T Technical Journal*, Vol. 64, No. 1, Part 2 (Jan. 1985), and in A. Feiner, "Architecture, Design, and Development of the System 75 Office Communications System", *IEEE Journal on Selected Areas in Communications*, Vol. SAC-3, No. 4 (Jul. 1985), pp. 522–530.

Each module 101 provides switched communications between terminals 107, such as telephones and input and output data terminals, that are connected thereto by lines 108, and also provides connections via trunks 110 to gateways 109. A gateway 109 is, for example, an interface to the public telephone (circuit-switched) network. Terminals 107, gateways 109, lines 108, and trunks 110 are conventional, as is their connection to modules 101.

Internally, each switch module 101 includes a time-division multiplex (TDM) bus 103 for carrying circuit-switched communications. Terminals 107 and gateways 109 are interfaced to bus 103 by port circuits, simply referred to as ports 106. Bus 103 operates under control of a switch processing element (SPE) 104, which is the control complex of the System 75 PBX, illustratively described in the IEEE and AT&T publications referred to previously.

Interconnection between modules 101 allows terminals 107 and gateways 109 connected to one module 101 to communicate with terminals 107 and gateways 109 connected to the other module 101. The interconnection comprises an inter-module tie trunk 111 that is interfaced at each end to TDM bus 103 of a different switch module 101 by a port 106, and an RS 232 serial link 112 that is interfaced at each end to TDM bus 103 of a different module 101 by a dataline circuit (D.C.) board 105. Trunk 106 carries user, i.e., inter-port 106, communications, while link 112 carries control, i.e., inter-SPE 104, communications.

Figure 2:
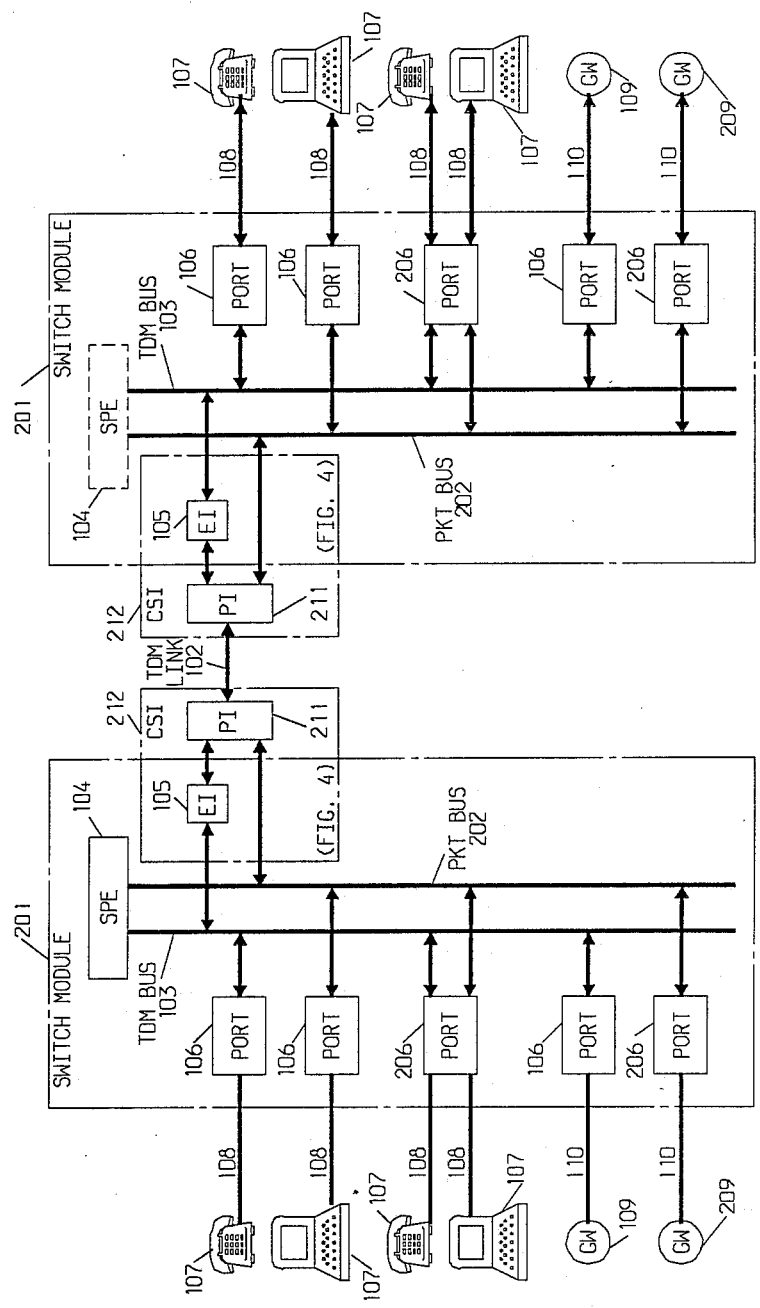
FIG. 2 is a block diagram of the system of FIG. 1 as modified according to this invention.

FIG. 2 shows the system of FIG. 1 modified to support the present invention. Elements of FIG. 2 which are the same as those of FIG. 1 bear the same numerical designations as in FIG. 1. In addition to TDM bus 103, the two switch modules of FIG. 2, now designated by the numbers 201, include a packet (PKT) bus 202 for carrying packet-switched communications. Bus 202 is a part of the System 75 PBX, but has hitherto not been used. Like bus 103, bus 202 also operates under control of SPE 104. Bus 202 carries packetized communications between terminals 107 and gateways 209 that are connected thereto by ports 206. A gateway 209 is, for example, an interface to a public packet network. The structure and operation of ports 106 and 206 and buses 103 and 202 are described in U.S. Pat. No. 4,535,448, which is hereby incorporated herein by reference.

FIG. 2 also shows at each switch module 201 a central stage interface (CSI) 212, which provides an interface between both TDM bus 103 and PKT bus 202 and an inter-module time-division-multiplexed (TDM) link 102. Functionally, CSI 212 may be thought of as combining an AT&T TN 776 expansion interface (EI) 105 which provides an interface for TDM bus 103 to a link, and a packet interface (PI) 211 which provides an interface for PKT bus 202 and EI 105 to TDM link 102. In general, the structure and functionally of PI 211 of CSI 212 are illustratively disclosed in U.S. Pat. No. 4,731,785. Each CSI 212 includes both transmit and receive portions of the apparatus shown in U.S. Pat. No. 4,731,785, with EI 105 generally corresponding to the transmitting and receiving circuit switches thereof. U.S. Pat. No. 4,731,785 is hereby incorporated herein by reference.

Alternatively, only one switch module 101 need include SPE 104, with a database of routing and translation information for both modules 101. In that case, some of the mechanisistic functions of the "missing" SPE 104 are performed by intelligence, e.g., a microprocessor, of EI 105 of the module 101 without SPE 104, based on database information provided thereto by SPE 104 of the outer module 101.

CSI 212 of a module 201 is active on every inter-module call to exchange communications from either TDM bus 103 or PKT but 202 of its module 201 with those of the other switch module 201 involved in the call via the inter-module TDM link 102. The format in which information is conveyed over link 102 is shown in FIG. 3. CSI 212 receives packets and eight-bit time slots of information from buses 202 and 103, respectively, and inserts the circuit-switched information from TDM bus 103 into data (D) fields 313 of selected 10-bit time slots 300 of a transmission frame 302 of TDM link 102. This leaves the remaining time slots 300 of frame 302 idle with respect to circuit-switched traffic, and hence available for the transmission of packet data. CSI 212 breaks down each received packet into eight-bit bytes and inserts the bytes into data (D) fields 313 of the idle time slots 300 of a frame 302 of TDM link 102. CSI 212 adds an identity (I) bit 312 and a parity (P) bit 314 to the eight data (D) bits 313 within each time slot 300. The value of I bit 312 for a time slot 300 signifies whether D field 313 time slot 300 represents a byte of circuit-switched or packet-switched information. I bit 312 is used by the receiving circuitry of CSI 212 at the other end of link 102 to route the received time slot 300 and its contents to either the circuit-switch facilities i.e., TDM bus 103, or to the packet-switch facilities, i.e., PKT bus 202. Time slots 300 of link 102 are grouped into subframes 301 each comprising three time slots 300 together with a framing (F) bit 310 and a spare (S) bit 311 prepended thereto, for a total of 32 bits. Subframes 301 are, in turn, grouped into frames 302 each comprising 128 subframes 301, for a total of 4096 bits per frame.

Figure 4:
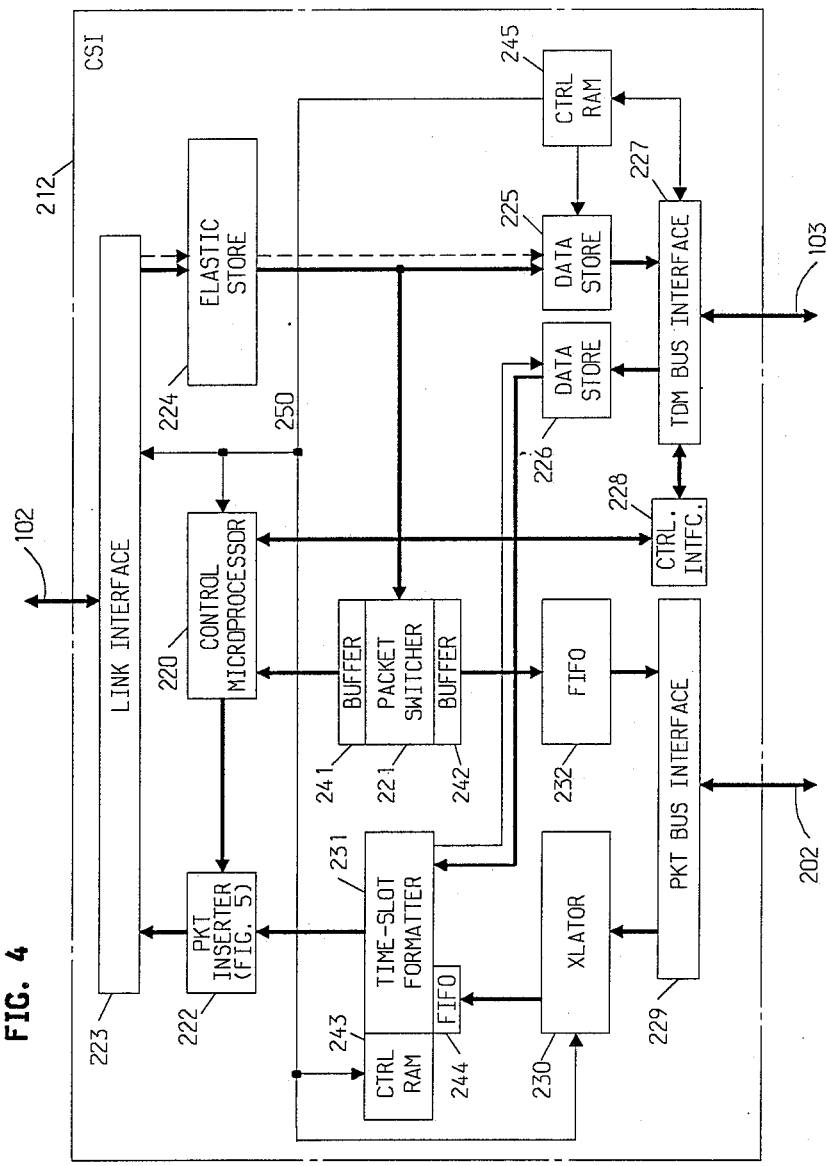
FIG. 4 is a block diagram of the CSI of the system of FIG. 2.

An illustrative implementation of CSI 212 is shown in FIG. 4. CSI 212 is controlled by an on-board control microprocessor 220. Microprocessor 220 programs various other elements of CSI 212 for the purpose of setting up transmission paths. For this purpose, microprocessor 220 also communicates with SPE 104, from which it receives the requisite programming information. Microprocessor 220 communicates with SPE 104 within its switch module 201 via the TDM bus 103 as if it were any other port 106 or 206 controller. The principles of communication between the microprocessor 220 and SPE 104 are described in U.S. Pat. No. 4,389,720, which is hereby incorporated herein by reference. Alternatively, if its switch module 201 does not have an SPE 104, microprocessor 220 communicates with SPE 104 of a remote switch module 201 by means of packets sent via TDM link 102. Microprocessor 220 also communicates with other processor outside of its switch module 201 over link 102 by means of packets. Microprocessor 220 is connected to a packet switcher 221 to receive packets from TDM link 102, and is connected to a packet inserter 222 to transmit packets on TDM link 102.

Link interface 223 terminates TDM link 102. TDM link 102 is bidirectional: CSI 212 both transmits information on, and receives information from, link 102 in TDM form. On the CSI 212 receive side, link interface 223 recovers bit timing and framing information from the incoming data stream, and converts the data from bit-serial into bit-parallel form. An elastic store 224, also commonly known as a partial-frame buffer or a delta buffer, receives both the bit-parallel data stream and the recovered timing and framing information from link interface 223, and synchronizes the time-slot boundaries between the received data and the timing of the rest of CSI 212 and switch module 201. Elastic store 224 is implemented as a FIFO buffer, and accomplishes synchronization by the simple expedient of having its write timing controlled by the recovered timing information while having its read timing controlled by a clock of CSI 212. CSI 212 thereby alleviates any phase deviations and jitter that may be affecting the received data.

The incoming data stream carries integrated circuit-switched and packet-switched information. Following elastic store 224 on the receive side of CSI 212, circuit-switching and packet-swtiching functions diverge. In the circuit-switch path, a data store 225 continuously fills its 512 10-bit memory locations, each with the 8-bit data field and P and I bits of all time slots incoming from elastic store 224. Data location (i.e., addressing for purposes of data storage) within data store 225 is based on a 9-bit counter (not shown) within data store 225, which is incremented by the recovered time slot timing information and reset by the recovered frame clock information received from elastic store 224.

Data is removed from data store 225 and transmitted on TDM bus 103 by TDM bus interface 227 under control of a conventional control RAM 245. RAM 245 has programmed therein, by microprocessor 220 via a control path 250, the particular sequence in which locations of store 225 are emptied of their contents. Data store 225 and RAM 245 together function as a time-slot interchange unit. The programmed sequence in control RAM 245 causes TDM bus interface 227 to retrieve from data store 225 only time slots of circuit-switched data. Time slots of packet-switched data are not retrieved and are discarded by being overwritten by newly-received data. Each retrieved time slot of circuit-switched data is transmitted by tri-statable TDM bus interface 227 on TDM bus 103 in response to a enable signal issued to interface 227 by RAM 245, in a conventional manner.

The first five time slots of each frame on TDM bus 103 are dedicated to a control channel used by SPE 104 and microprocessor 220 to communicate with each other. Messages generated by microprocessor 220 for SPE 104 are sent by microprocessor 220 to a control interface circuit 228. Circuit 228 breaks the messages down into time slots and presents the time slots to TDM bus interface 227 for transmission on TDM bus 103 in the first five time slots of bus 103.

In the packet-switched path, packet switcher 221 accepts from elastic store 224 only time slots of packet data (as identified by the value of their I bit), and buffers packets in buffers 241 and 242. Arriving packets with a bad CRC code are discarded; the system relies on the LAPD protocol for retransmission of dropped packets. Switcher 221 also examines the address of arriving packets to determine their destination, and buffers them accordingly. Switcher 221 determines the destination by examining the first valid (i.e., as yet unused) address of the packet's routing vector. Packets bound for PKT bus 202 are bufferd in buffer 242, whereas packets destined for microprocessor 220 are buffered in buffer 241. Packets having no valid address are discarded by switcher 221. When a full packet has been queued by buffer 241, packet switcher 221 sends an interrupt to microprocessor 220 to notify it thereof and cause it to retrieve the queued packet from buffer 241. When a full packet has been queued by buffer 242 and FIFO buffer 232 has notified switcher 221 that is has room to store a full packet, switcher 221 loads the queued packet from buffer 242 into FIFO buffer 232. Illustratively, buffer 242 is structured and administered in the manner described in application of A. D. Franklin and R. J. Gallegos, entitled "Programmable Data Packet Buffer Prioritization Arrangement", Ser. No. 340,623, mailed filed on Apr. 19, 1989, and assigned to the same assignee as this application, which is hereby incorporated herein by reference.

FIFO buffer 232 queues packets destined for PKT bus 202. When it has received a packet from switcher 221, FIFO buffer 232 notifies PKT bus interface 229, which responds to the notice by contending for control of PKT bus 202 in a conventional manner. When interface 229 obtains control of PKT bus 202, it retrieves the packet from FIFO buffer 232 and transmits it on PKT bus 202, in a conventional manner.

The circuit and packet paths are also separate on the CSI 212 transmit side between TDM bus 103 and PKT bus 202 and a time slot formatter 231. On the circuit side, all time slots from TDM bus 103 are captured by TDM bus interface 227, in a conventional manner. The first five time slots of each TDM bus 103 frame, which are dedicated to the abovementioned SPE 104-microprocessor 220 control communication channel, are presented by TDM bus interface 227 to control circuit 228. Circuit 228 takes the time slots from interface 227 and makes them available to microprocessor 220.

The remaining time slots of each TDM bus 103 frame are captured and forwarded by TDM bus interface 227 to data store 226, where they are stored. From there, the time slots destined for transmission on link interface 102 are retrieved by time-slot formatter 231; the remaining time slots in data store 226 are discarded by being overwritten with newly-received data.

The packet path is more complicated. PKT bus interface 229 monitors PKT bus 202 for packets addressed to CSI 212, and passes those to a translator 230, where packet address information is translated into a routing vector. Specifically, translator 230 translates a port address and a logical-channel identifier which is included in the packet, into the routing vector. For this purpose, translator 230 includes a large dynamic RAM (not shown), which in this illustrative embodiment supports up to 64K translations. The port address and logical-channel identifier serve as a pointer to one of the routing vectors stored in the RAM. The contents of the RAM are programmed by microprocessor 220 via control path 250, on the basis of information provided to microprocessor 220 by SPE 104. Translator 230 prepends the routing vector to the receive packet, and also computes and prepends a CRC error correction code for the routing vector. Translator 230 then sends the packet to a FIFO buffer 244 of time-slot formatter 231 for insertion into the outbound data stream.

Time-slot formatter 231 implements circuit-and packet-switched data multiplexing: it meters out circuit and packet information to fill the out-bound TDM 102 link bandwidth. Time-slot formatter 231 contains a 512-word circuit-and packet-multiplexer control RAM 243, whose contents are programmed by micrprocessor 220 over control path 250 as it sets up and takes down circuit-switched connections to TDM link 102. The contents of control RAM 243 specify which time slots of TDM bus 103 are to be inserted into which time slots of TDM link 102. The contents of control RAM 243 are cycled through sequentially, once per frame. The content of each control RAM 243 location causes formatter 231 to select time slots from either TDM bus 103 (i.e., from data store 226) or packet information for PKT bus 202 (i.e., from FIFO buffer 244) for insertion into the data field of each out-bound link 102 time slot. For each out-bound link 102 time slot, a TDM bus 103 time slot may be inserted into the data field of the link 102 time slot, but for many of the time slots, TDM bus 103 time slots are not specified by RAM 243 for insertion, i.e., the link 102 time slots are "idle". Formatter 231 inserts packet information into the data field of those "idle" time slots. Formatter 231 does not commence to insert bytes of a packet into link 102 "idle" time slots until the full packet has been received in FIFO buffer 244. Receipt of a full packet is indicated to formatter 231 by the receipt in FIFO buffer 244 of the end-of-packet (EOP) bit—the last bit of a packet. While no packet data is available for insertion, formatter 231 instead inserts an "idle" pattern of flag characters into the "idle" time slots. For each outgoing time slot, formatter 231 also sets the value of the I bit to indicate whether it carries circuit-switched or packet-switched data. Time-slot formatter 231 then sends the combined circuit and packet stream of outgoing time slots to a packet inserter 222.

Packet inserter 222 allows microprocessor 220 to insert into the outgoing data stream packets that it wishes to transmit to other processors outside of its switch module 101. Packet inserter 222 momentarily buffers time slots of packet data outgoing from formatter 231 to allow infrequent microprocessor 220-originated packets to slip into the data stream. After a microprocessor 220-originated packet has been inserted, the buffered time slots of packet data from time-slot formatter 231 are allowed to proceed. Packet inserter 222 has no effect on time slots carrying circuit-switched data. Packet inserter 222 is shown in greater detail in FIGS. 5-6.

The transmit side of link interface 223 accepts time slots from packet inserter 222 for transmission over TDM link 102. Link interface 223 converts the data from bit-parallel into bit-serial format, inserts framing information—framing (F) bits—as well as spare (S) bits into the time-slot stream, and then transmits the time-slot stream onto TDM link 102.

Figure 5:
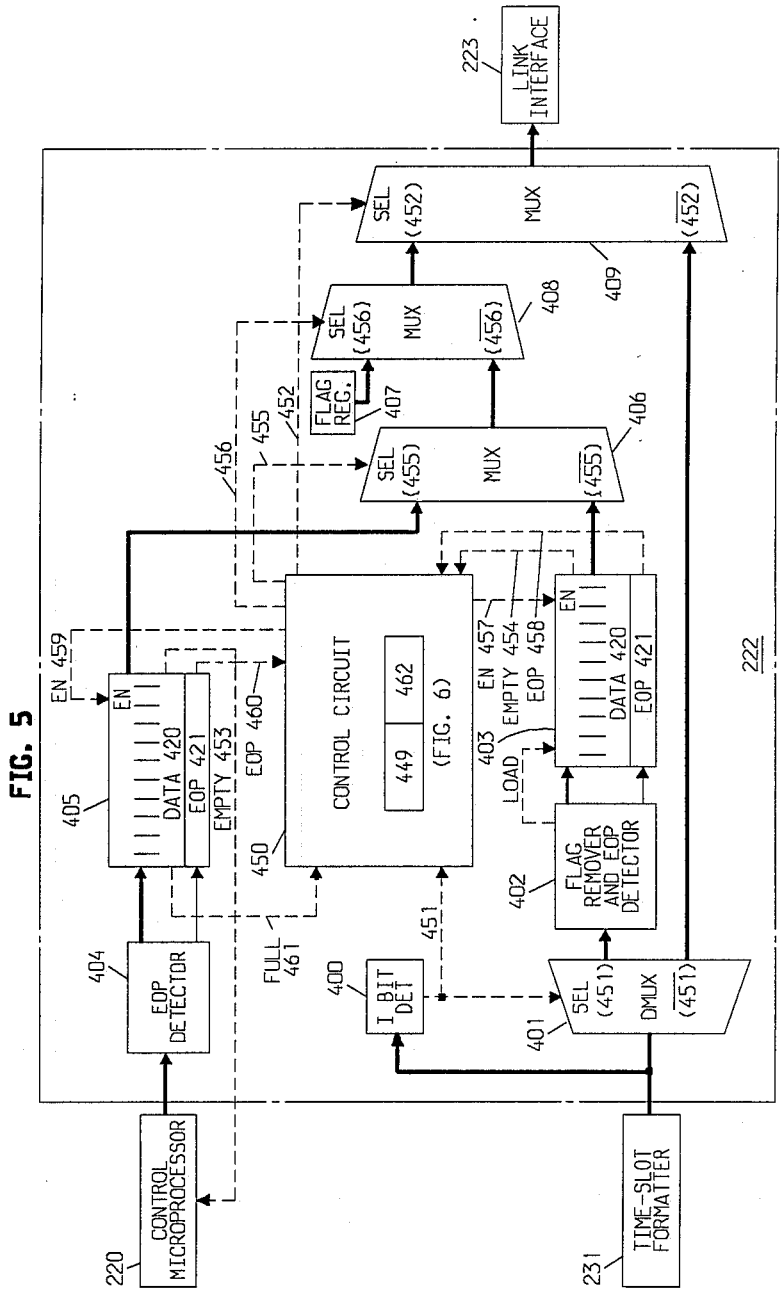
FIG. 5 is a block diagram of the packet inserter of the CSI of FIG. 4.
Figure 6:
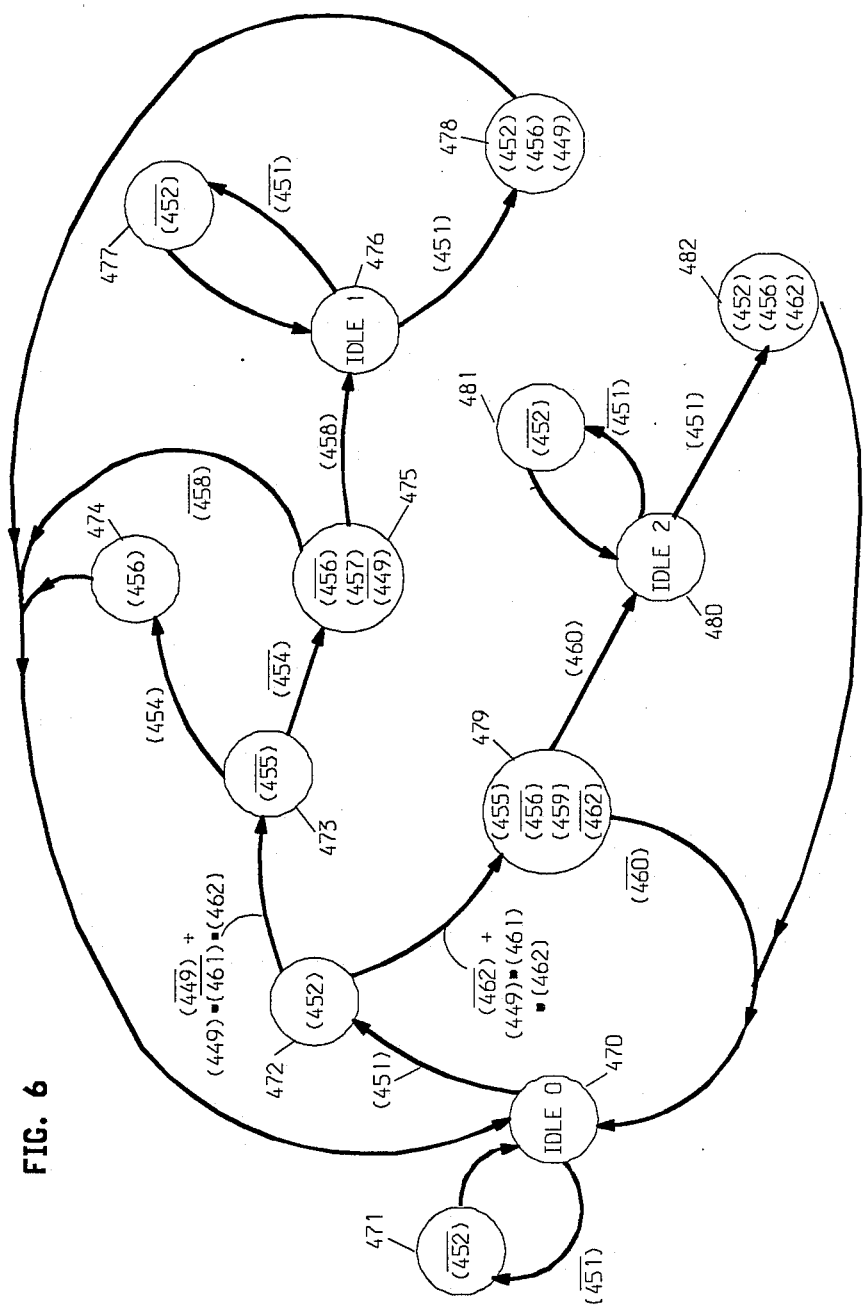
FIG. 6 is a state diagram of the control circuit of the packet inserter of FIG. 5.

Returning to consider packet inserter 222 in greater detail, its structure is shown in FIG. 5. In addition, FIG. 6 shows a state diagram of control circuit 450 of inserter 222. A representational convention used in FIGS. 5 and 6 is that a numeral designating a signaling or control lead and that appears in parentheses represents the signal value of that lead. The numeral without a bar thereabove represents the asserted high value of a tri-state lead and the asserted value of a bi-state lead; the numeral with a bar thereabove represents the asserted low value of a tri-state lead and the unasserted value of a bi-state lead.

As shown in FIG. 5, time slots incoming from time-slot formatter 231 enter the input of a demultiplexer 401. The incoming time slots are also monitored by an I-bit detector circuit 400, which accesses the I-bit of each incoming time slot and on the basis of the I-bit value asserts high or low control lead 451. For example when the I-bit value is 1 to indicate a circuit-switched data time slot, circuit 400 asserts lead 451 low ($\overline{451}$), and when the I-bit value is 0 to indicate a packet-switched data time slot, circuit 400 asserts lead 451 high (451). Lead 451 is connected to the SELect input of two-way demultipler 401, and to an input of a control circuit 450.

One output of demultiplexer 401 is connected to an input of a flag remover and end-of-packet (EOP) detector 402, while the other output of demultiplexer 401 is connected to an input of multiplexer 409. Assertion of control lead 451 low ($\overline{451}$) by detector 400 to indicate that the incoming time slot contains circuit data, causes demultiplexer 401 to connect its input to its output which is connected to multiplexer 409, thereby sending the time slot to multiplexer 409.

Circuit 450 is a sequential circuit represented by the state diagram of FIG. 6. When it is in between packet transmissions, circuit 450 is in IDLE 0 state 470. In any IDLE state, including state 470, tristate leads controlled by circuit 450 are not asserted and bistate leads controlled by circuit 450 are asserted low. The asserted value of control lead 451 is repeated by control circuit 450 on control lead 452 which is connected to the SELect input of multiplexer 409. Assertion low of lead 451 ($\overline{451}$) identifies a time slot of circuit data and causes circuit 450 to make a transition to state 471, wherein it asserts low lead 452 ($\overline{452}$). This in turn causes multiplexer 409 to connect its circuit-switched data input—the one that is connected to the output of demultiplexer 401—to its output, thereby sending the time slot to link interface 223. Consequently, a circuit-switched time slot passes through packet inserter 222 unaffected. Circuit 450 then returns to IDLE 0 state 470.

Returning to I-bit detector 400, assertion high of control lead 451 (451) indicates that the incoming time slot contains packet data, and causes demultiplexer 401 to connect its input to an output which is connected to flag remover and EOP detector 401. Remover and detector 402 examines the data carried by the time slot to determine whether the data are flag characters. These may be packet-delimiting flag characters, or the flag characters inserted by time-slot formatter 231 into "idle" time slots when no packet data is available for insertion therein; or they may also occur as true data characters within a packet. In the latter case, flags that are true data charaters are preceded by a special "escape" character to identify them as data. (The "escape" character may also occur as true data, in which case it, too, is preceded by an additional "escape" character.) This is a common "byte stuffing" technique used by byte-oriented protocols. Remover and detector 402 discards time slots that carry delimiter and idle flag characters, and loads other time time slots—including those that carry flag characters preceded by escape characters, i.e., true data flag characters—into a FIFO buffer 403. Flag characters that delimit the end of a packet cause remover and detector 402 to generate an EOP signal to accompany the time slot through FIFO buffer 403.

FIFO buffer 403 comprises two sections: a data section 420 for storing each time slot received from remover and detector 402, and a 1-bit wide EOP section 421 for storing the EOP signal, if any, that accompanies each time slot. FIFO buffer 403 automatically stores information that appears at its input; the output of FIFO buffer 403 operates under control of control circuit 450.

FIFO buffer 403 buffers packets incoming from formatter 231 while packets generated by microprocessor 220 are being inserted into the data stream. Consequent, FIFO buffer 403 must be deep (i.e., large) enough to store as many packets as may be received form formatter 231 while insertion is taking pace. In this illustrative embodiment, only one microprocessor 220-generated packet may be inserted into the data stream at a time, and hence FIFO buffer 403 is one packet deep.

The high asserted value of control lead 451 (451), which indicates that the received time slot carries packet information, is received by control circuit 450 and causes it to make a transition to state 472, wherein it asserts high control lead 452 (452). This causes multiplexer 409 to connect its packet-swtched data input to its output. The high asserted value of lead 451 also causes circuit 450 to check, in state 472, whether inserter 222 is in the midst of transmitting a packet from FIFO buffer 403 or from microprocessor 220 into the data stream. Control circuit 450 does this by checking the state of internal flags 449 and 462, respectively, which it keeps for this purpose. As will be described further below, control circuit 450 sets flag 449 when it completes transmission of a packet from FIFO buffer 403, and clears flag 449 when it commences such a transmission. Similarly, control circuit 450 sets flag 462 when it completes transmission of a packet from microprocessor 220, and clears flag 462 when it commences such a transmission. If it finds that it is in the midst of transmission of a packet from FIFO buffer 403, i.e., flag 449 is reset ($\overline{449}$), control circuit 450 undertakes to complete the transmission irrespective of whether microprocessor 220 has made available a packet for insertion into the data stream. Similarly, if it finds that it is in the midst of transmission of a packet from microprocessor 220, i.e., flag 462 is reset ($\overline{462}$), control circuit 450 undertakes to complete the transmission irrespective of whether formatter 231 has made available a packet for transmission. If, however, control circuit 450 finds that it is not in the midst of transmitting a packet, i.e., flags 449 and 462 are set (449, 462), it checks whether microprocessor 220 has made available a packet for insertion into the data stream. Illustratively, circuit 450 does so by checking a control lead 461 from a FIFO buffer 405 to determine whether FIFO buffer 405 is full, as will be described further below. Typically, no packet from microprocessor 220 is available and so FIFO buffer 405 is not full and lead 461 is asserted low ($\overline{461}$).

Assuming either that inserter 222 is in the midst of transmitting a packet from FIFO buffer 403, or that it is not in the midst of such a transmission but FIFO buffer 405 is not full, it means that time slots of packets from FIFO buffer 403 may be sent to TDM link 102 without delay. Control circuit 450 therefore makes a transition to state 473, wherein it asserts low a control lead 455 (455) to signal a two-way multiplexer 406—whose inputs are respectively connected to the outputs of FIFO buffer 403 and FIFO buffer 405—to cause multiplexer 406 to connect the output of FIFO buffer 403 to its output. In state 473, control circuit 450 also checks a control lead 454 from FIFO buffer 403 to determine whether FIFO buffer 403 is empty. If lead 454 is asserted high (454) to signal that FIFO buffer 403 is empty, it means that no packet data is available in FIFO buffer 403 for transmission—for example, because the last time slot received by packet inserter 222 from time-slot formatter 231 contained flag characters—and hence inserter 222 must generate flag characters to fill the time slot. Control circuit 450 therefore makes a transition to state 474, wherein it asserts high a control lead 456 (456) leading to a multiplexer 408—whose two inputs are respectively connected to the output of multiplexer 406 and to the output of a flag register 407—to cause multiplexer 408 to connect the output of flag register 407 to its own output. Register 407 permanently stores the system flag characters. The output of multiplexer 408 is wired to the packet-switched data input of multiplexer 409, so the flag character is received by multiplexer 409 and is inserted thereby into the data stream outgoing to interface 223. Control circuit 450 then returns from state 474 to IDLE 0 state 470.

Returning to state 473, if lead 454 is asserted low ($\overline{454}$) to signal to control circuit 450 that FIFO buffer 403 is not empty, it means that packet data is available for transmission. Control circuit 450 therefore makes a transition to state 475, wherein it asserts low control lead 456 ($\overline{456}$) leading to multiplexer 408 to cause it to connect the output of multiplexer 406 (whose output is in turn connected to the output of FIFO buffer 403) to its own output. Control circuit 450 also asserts high a control lead 457 of FIFO buffer 403 to enable it to output a stored time slot. And control circuit 450 resets flag 449 to indicate that a transmission of a packet from FIFO buffer 403 is in progress. The time slot propagates from output of FIFO buffer 403 through multiplexer 406, 408, and 409 into the data stream outgoint to interface 223. At the same time, control circuit 450 monitors, via control lead 458, the EOP signal that accompanied the time slot through FIFO buffer 403, to determine whether this is the last time slot of a packet. If control lead 458 is asserted low ($\overline{458}$) to indicate to control circuit 450 the absence of the EOP signal, circuit 450 merely returns from state 475 to IDLE 0 state 470. If, however, control lead 458 is asserted high (458) to indicate to control circuit 450 the presence of the EOP signal, it means that the next time slot of this packet—which has been received from formatter 231—will have a packet-delimiting flag, and it will have been discarded by circuit 402. Hence, control circuit 450 must regenerate and reinsert a time slot containing a packet-delimiting flag into the data stream. To do so, circuit 450 makes a transition to IDLE 1 state 476. In this state, upon low assertion of control lead 451 ($\overline{451}$) indicative of a circuit-switched time slot, circuit 450 makes a transition to state 477 to assert low lead 452 ($\overline{452}$), and then returns to state 476. But at next high assertion of control lead 451 by circuit 400, indicative of a packet-switched time slot, control circuit 450 makes a transition to state 478, wherein it asserts high control leads 452 and 456 (452, 456) to cause a time slot containing a flag character to be sent from flag register 407 through multiplexer 408 and 409 into the outgoing signal stream. Control circuit 450 also sets internal flag 449 (449) at this point, to indicate completion of transmission of a packet from FIFO buffer 403. Only then does control circuit 450 return to IDLE 0 state 470.

Packets generated by microprocessor 220 and sent out for insertion into the data stream are received in packet inserter 222 by an EOP detector 404, which functions like the EOP detector function of circuit 402. Microprocessor 220 does not generate packet delimiting flags, so no flag remover function is required in EOP detector 404. However, flag characters and escape characters occuring as true data have escape characters inserted in front of them by EOP detector 404. As mentioned above, this ensures that these characteres are treated as true data by downstream circuits. The output of EOP detector 404 is received and stored by FIFO buffer 405, which is an equivalenf of FIFO buffer 403; it, too, has a data section 420 for time slot data and an EOP section 421 for the accompanying EOP indicator bit. In this illustrative embodiment, FIFO buffer 403 also is one packet deep. FIFO buffer 403 has connected thereto a control lead 453 for giving an indication that it is empty, and a control lead 461 for giving an indication that is full. Microprocessor 220 cannot commence to store a packet in FIFO buffer 403 until it is empty, and hence it monitors lead 453; conversely, control circuit 450 cannot commence to remove a packet from FIFO buffer 405 until it is full, and hence it monitors lead 461.

Returning to the check that control circuit 450 performs in state 472, if circuit 450 determines, from flag 462 being reset ($\overline{462}$), that a transmission of a microprocessor 220-generated packet from FIFO buffer 405 is in progress, or if control circuit 450 determines from an examination of flags 449 and 462 that it is not in the midst of transmitting any packet ($\overline{449}$, $\overline{462}$) and also determines from an examination of control lead 461 that microprocessor 220 has made available a packet and FIFO buffer 405 is full (461), control circuit 450 makes a transition to state 479, wherein it asserts high control lead 455 (455) to signal multiplexer 406 to connect the output of FIFO buffer 405 to its own output, asserts low control lead 456 ($\overline{456}$) to signal multiplexer 408 to connect the output of multiplexer 406 to its own output, and also asserts high control lead 459 (459) to enable FIFO buffer 405 to output a stored time slot. Control circuit 450 furthermore resets flag 462 to indicate that a transmission fo a packet from FIFO buffer 405 is in progress. The time slot propagates from output of FIFO buffer 405 through multiplexers 406, 408, and 409 into the data stream outgoing to interface 223. At the same time, control circuit 450 monitors, via control lead 460, the EOP signal that accompanied the time slot through FIFO buffer 405, to determine whether this is the last time slot of a packet. If control circuit 450 does not detect the EOP signal ($\overline{460}$), circuit 450 merely retuns from state 479 to IDLE 0 state 470. If, however, control circuit 450 does detect the EOP signal (460), it means that the last time slot of a packet has just been sent, and hence packet inserter 222 must generate and insert a packet-delimiting flag time slot into the data stream. To do so, circuit 450 makes a transition to IDLE 2 state 480. In this state, upon low assertion of control lead 451 ($\overline{451}$), indicative of a circuit-switched time slot, circuit 450 makes a transition to state 481 to assert low lead 452 ($\overline{452}$), and then returns to state 480. But at next high assertion of control lead 451 (451), indicative of a packet-switched time slot, control circuit 450 makes a transition to state 482, wherein it asserts high control leads 452 and 456 (452, 456) to cause a time slot of flag characteres to be sent from flag register 407 through multiplexers 408 and 409 into the outgoint signal stream. Circuit 450 also sets flag 462 to indicate that it has just completed transmission of a microprocessor 220-generated packet. Control circuit 450 then returns to IDLE 0 state 470. It will now transmit a packet from FIFO buffer 403, if one is available.

In accordance with the invention, to enable more than two swtich modules 201 to communicate with each other, the modules 201 are interconnected through a center stage network (CSN) 400 to form a multi-node switching system, as shown in FIG. 7. Each module 201 is a communication-originating-and-terminating, or endpoint, node of the system of FIG. 7, while CSN 400 comprises one or more intermediate, or switching, nodes of the system of FIG. 7. Each module 201 is connected by its TDM link 102 not directly to another module 201, but to CSN 400. Any number of modules 201 may be interconnected in this manner, making the system of FIG. 7 substantially infinitely growable.

CSN 400 is operative on each inter-module circuit-switched call to interconnect the two or more switch modules 201 that are involved in the call connection. CSN 400 typically comprises a plurality of network switch nodes, as subsequently described. A circuit-switched connection is established through CSN 400 on an inter-module call when an SPE 104 transmits instructions in the form of packets through CSI 212 of the originating module 201 to CSN 400, specifying the path that is to be used within the network for this connection. These packetized instructions specify each and every network node that is to be used in completing a path from link 102 serving the originating module 201 to link(s) 102 serving the destination module(s) 201. An SPE 104 is capable of providing this information to CSN 400 because it has knowledge of the configuration of CSN 400 stored in a database of configuration and routing information maintained in SPE 104.

CSN 400 of FIG. 7 represents the generic concept of a CSN. The details and complexity of actual CSN configuration vary, depending upon a number of factors including the number of switch modules 201 to be interconnected, the network blocking requirements, and the anticipated inter-module 201 traffic levels. Examples of CSN configurations are presented below.

Figure 8:
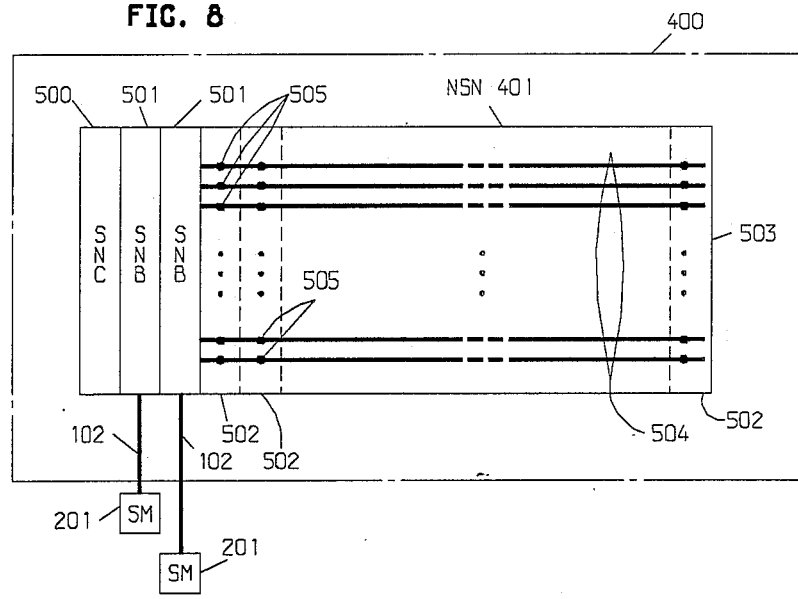
FIG. 8 is a block diagram of a first embodiment of the CSN of the system of FIG. 7.

FIG. 8 shows a single-node, single-level CSN 400 comprising a single network switch node (NSN) 401. This is the most basic CSN configuration; more complex CSN configurations comprise a plurality of interconnected NSNs 401. NSN 401 comprises a plurality of circuit modules 500–501 that are mounted in slots 502 of a single shelf, or carrier rack, 503. Shelf 503 carries a backplane bus 504 for interconnecting modules 500–501. Modules 500–501 connect to individual leads of backplane bus 504 by means of contact points 505, such as contact pins. Shelf 503 provides slots 502 for up to 16 switching circuit modules 501.

Modules 500–501 of NSN 401 include a switch node clock (SNC) 500—which may be duplicated—and a plurality of switch node boards (SNBs) 501. SNC 500 is a clock circuit that generates timing signals required by SNBs 501 for their operation and distributes those timing signals to SNBs 501 by means of leads of backplane bus 504. SNC 500 effects synchronization between SNBs 501 of an NSN 401 with the rest of the system in the manner described in U.S. Pat. No. 4,736,393, which is hereby incorporated herein by reference. SNC 500 exchanges the information requisite for this purpose with SNCs 500 of other NSNs 401 through SNBs 501.

Each SNB 501 comprises a microprocessor together with associated circuitry required to perform switching functions for inter-module 201 communications, as subsequently described. Each SNB 501 is connected directly to only one TDM link 102. Since inter-module 201 communications require the presence of at least two modules 201, and each module 201 is connected to SNC 400 by its own TDM link 102, it follows that a minimum of two SNBs 501 are required to be present in an NSN 401 in order for NSN 401 to be able to service inter-module 201 communications. Control and inter-module 201 communications flow between SNBs 501 over leads of backplane bus 504. As switch modules 201 are added to the system of FIG. 4, an SNB 501 is added to NSN 401 for each module 201 and is connected by TDM link 102 to the corresponding module 201.

Figure 9:
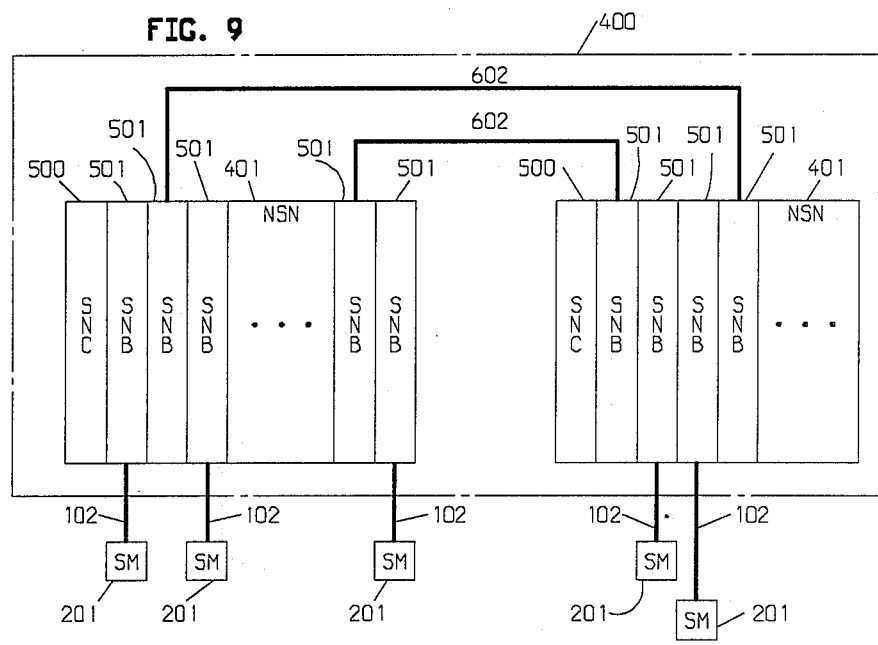
FIG. 9 is a block diagram of a second embodiment of the CSN of the system of FIG. 7 using the embodiment of FIG. 8 as a building block.

FIG. 9 shows a multi-node, single-level configuration of a CSN 400. The CSN shown in FIG. 9 includes two NSNs 401, each equipped with its own SNC 500 and each fully or partially equipped with a plurality of SNBs 501. Some SNBs 501 of each NSN 401 are connected to switch modules 201, while others are each connected to an SNB 501 of the other NSN 401. Inter-SNB 501 connection is accomplished by TDM links 602, which are identical to TDM links 102: an SNB 501 remains the same irrespective of whether it is connected to a switch module 201 or to another SNB 501. The inter-NSN 401 connections allow switch modules 201 which are directly connected to one NSN 401 to communicate with switch modules 201 which are directly connected to the other NSN 401. The number of inter-NSN 401 connections 602 depends primarily upon the volume of inter-NSN 401 traffic: if the volume is low, one connection may suffice; as the volume grows and one connection is insufficient to handle it, additional connections may be added. Also, the two NSNs 401 shown in FIG. 9 may be connected to yet other NSNs 401 in like manner. It is apparent from a comparison of FIG. 8 with FIG. 9 that CSN 400 of FIG. 7 can serve inter-node traffic between a greater number of switch modules 201.

Figure 10:
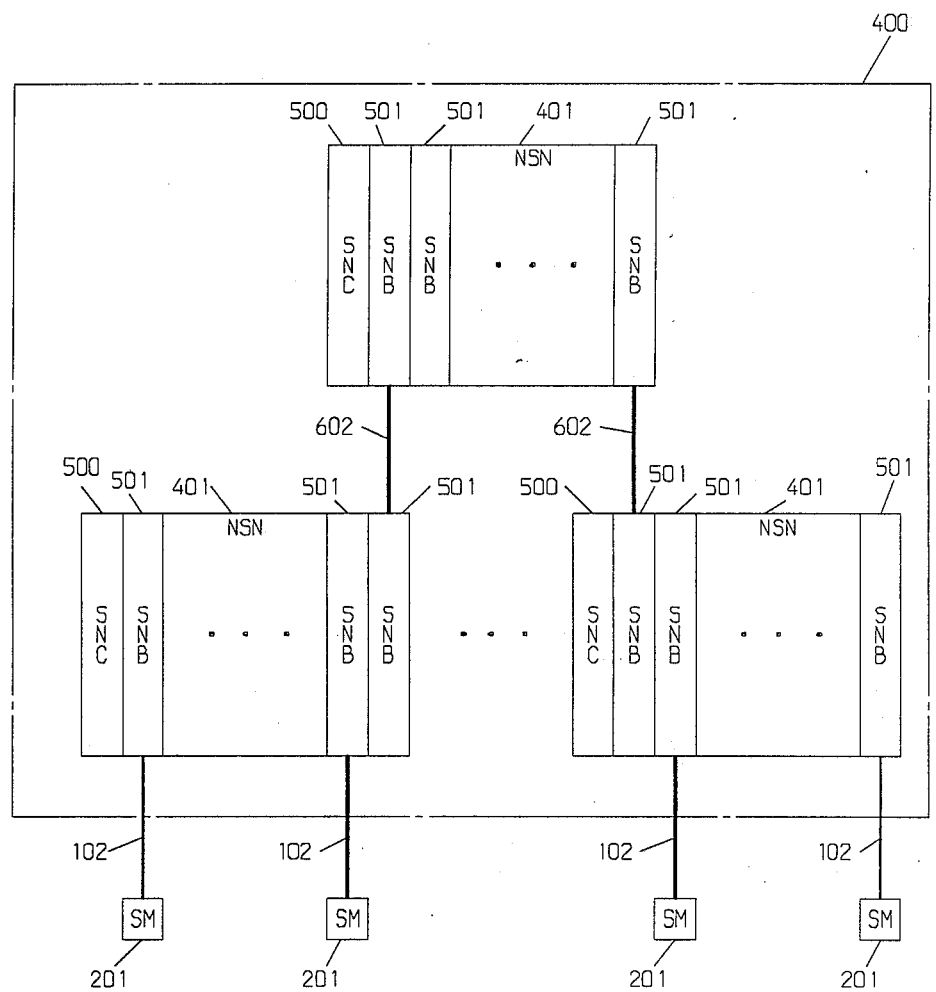
FIG. 10 is a block diagram of a third embodiment of the CSN of the system of FIG. 7 using the embodiment of FIG. 8 as a building block.

FIG. 10 shows a multi-level configuration of a CSN 400. The CSN shown in FIG. 10 includes three NSNs 401 each equipped with its own SNC 500 and a plurality of SNBs 501. In FIG. 10, the pair of NSNs 401 that are directly connected to switch modules 201, and that form one interconnection layer of CSN 400, are no longer interconnected by links 602 directly as in FIG. 9, but through another NSN 401 which is dedicated to interconnecting other NSNs 401 and thus forms another layer of interconnection within CSN 400. A comparison of FIG. 9 with FIG. 10 readily reveals that more NSNs 401—and hence more switch modules 201—can be interconnected through the multi-level CSN configuration of FIG. 10 than through the single-level configuration of FIG. 9, and that the configuration of FIG. 10 has a greater inter-node traffic volume-handling capacity.

Figure 11:
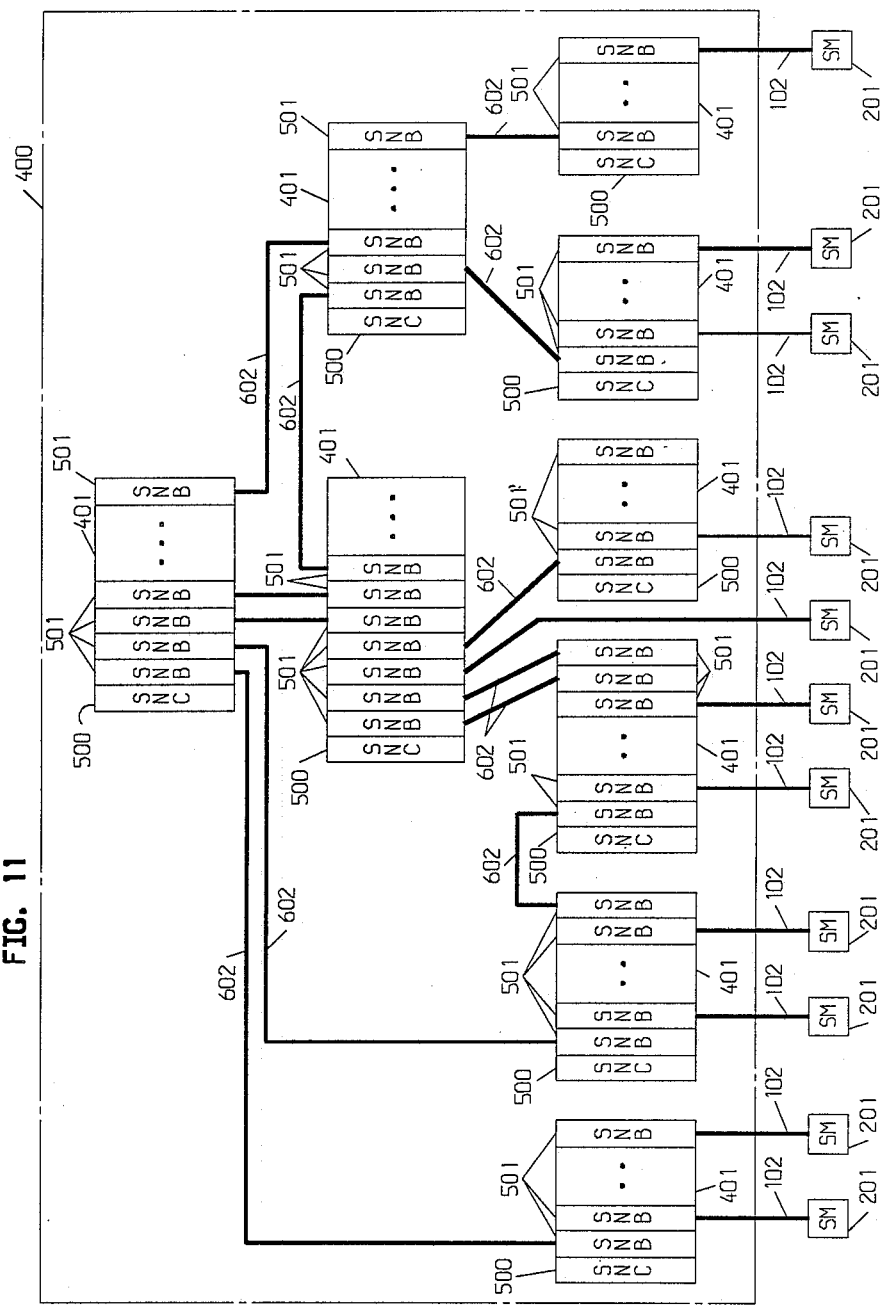
FIG. 11 is a block diagram of a fourth embodiment of the CSN of the system of FIG. 7 using the embodiment of FIG. 8 as a building block.

The multi-level configuration of FIG. 10 can readily be expanded to more levels, and various such configurations may be "mixed and matched" in a substantially arbitrary manner, as illustrated by the example of FIG. 11, to serve whatever number of switch modules 201 and to achieve whatever inter-node traffic-handling capacity is required. As this example also illustrates, more than one path through CSN 400 often exists between any two switch modules 201, and selection of a particular path may involve a balancing of path length, i.e., the number of NSNs 401 in a path, against congestion, i.e., traffic load carried by a path, redundancy needs, and other factors.

For purposes of further discussion, all SNBs 501 within a single NSN 401 are referred to as "peers," whereas an SNB 501 or a CSI 212 that is connected to an SNB 501 via a TDM link 102 or 602 is referred to as a "neighbor." The peers and neighbors of a CSI 212 or SNB 501 are collectively referred to as being topologically "adjacent" to that CSI 212 or SNB 501.

Figure 12:
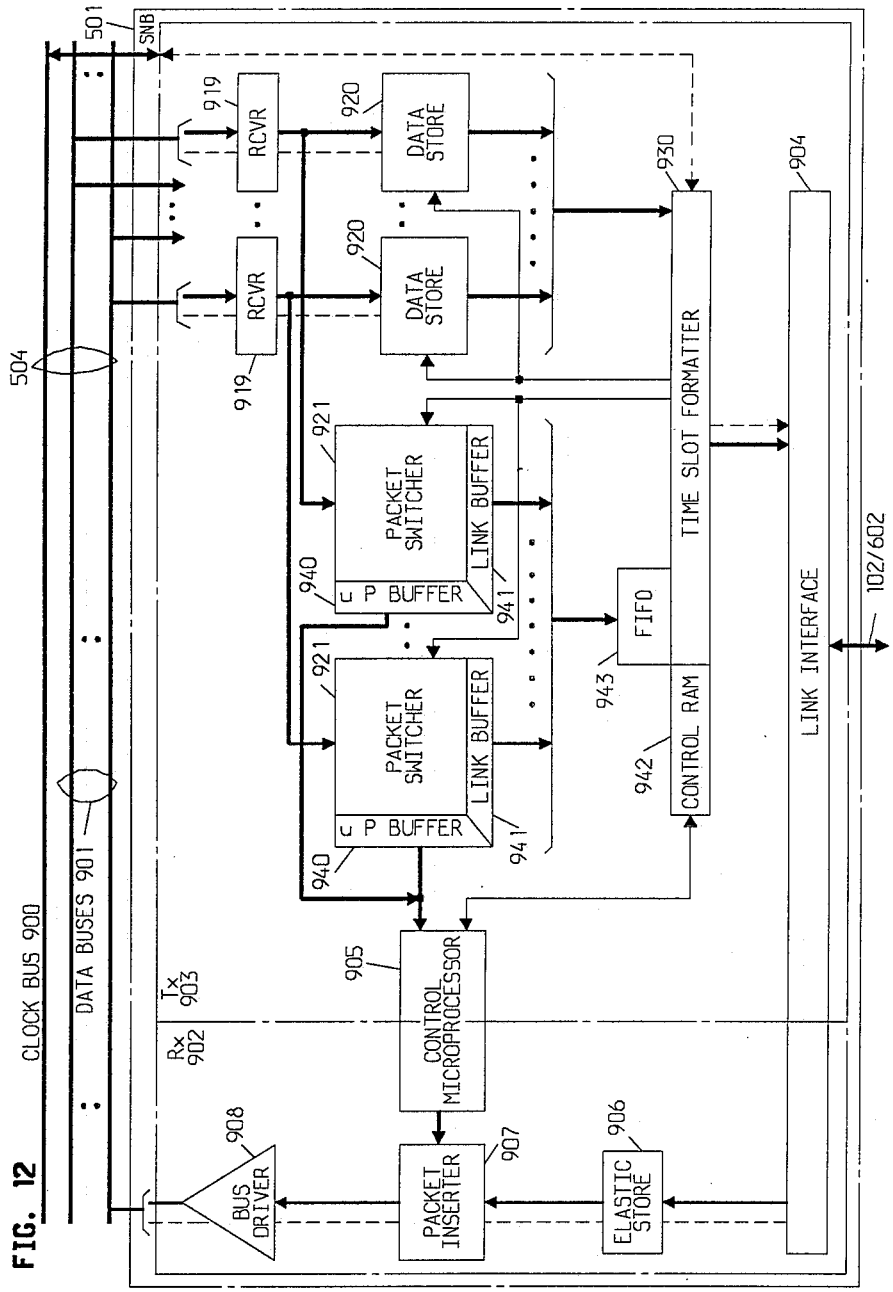
FIG. 12 is a block diagram of an SNB of the CSN of FIG. 8.

FIG. 12 shows the structure of a representative switch node board (SNB) 501—all SNBs 501 are identical—and of backplane bus 504 to which the SNBs 501 of an NSN 401 attach. Backplane bus 504 includes a clock bus 900, and a plurality of data buses 901 one for each SNB slot 502 of an NSN 401. Hence, in this illustrative example, backplane bus 504 includes 16 data buses 901. Clock bus 900 is connected to all modules 500-501 of NSN 401, and is used by SNC 500 to distribute clock and timing signals to SNBs 501. Data buses 901 interconnect all SNBs 501 and are used by SNBs 501 to communicate with each other. Each data bus 901 is illustratively a 10-bit-wide bus, i.e., it carries eight data bits plus the P and I bits in parallel. Alternatively, each bus 901 may be a 5-bit multiplexed bus. Each SNB 501 of NSN 401 is connected to all data buses 901 for purposes of signal reception, but each SNB 501 of NSN 401 is connected to a different one data bus 901 for purposes of signal transmission. Each SNB 501 can therefore transmit to all SNBs 501 by means of a single data bus 901, and each SNB 501 can receive from all SNBs 501 by means of all the data buses 901. Advantageously, since each SNB 501 transmits on only one—its own—data bus 901, faulty SNBs 501 are unlikely to foul up communications between other, healthy, SNBs 501.

SNB 501 may be thought of as comprising two sections: a receive section 902 which receives 10-bit time slots incoming from link 102 or 602 and transmits the incoming time slots on its own data bus 901, and a transmit section 903 which receives 10-bit time slots over all data buses 901 and transmits selected ones of the received time slots onto link 102 or 602. Sections 902 and 903 share among them a link interface 904 which couples SNB 501 to its TDM link 102 or 602 and permits SNB 501 to receive and transmit time slots over the connected TDM link 102 or 602. Link interface 904 is the equivalent of link interface 223 of CSI 212. Link 102 or 602 is a two-way link comprising a transmit path and a receive path, and may be a single physical conductor, such as an optical fiber, that implement both paths as separate channels, or may comprise separate conductors for each path, such as a pair of optical fibers. Another illustrative implementation of link 102 or 602 is a digital carrier (e.g., DS1 or DS3) over a metallic or microwave link. Sections 902 and 903 also share control microprocessor 905. Microprocessor 905 controls operation of both sections 902 and 903, in substantially the same manner as control microprocessor 220 controls CSI 212.

On the SNB 501 receive side 902, link interface 904 recovers bit timing and framing information from the data stream incoming on TDM link 102 or 602, and passes the data stream and the recovered information to elastic store 906. Elastic store 906 is the equivalent to elastic store 224 of CSI 214. It synchronizes the time slot boundaries between the received data and the timing of the rest of SNB 501. CSN 400 is nominally frequency-synchronous. Elastic store 906 only synchronizes the phase of time slots arriving on all links 102 and 602 of an NSN 401 with each other, and with the nominal phase of the rest of the NSN 401 circuitry. For example, time slot 58 may appear at the output of elastic store 906 of one SNB 501 simultaneously with the appearance of time slot 26 at the output of elastic store 906 of another SNB 501. This presents no problem, as long as the time slots appear simultaneously at the outputs of elastic stores 906 of all SNBs 501 of an NSN 401.

Microprocessor 905, which is controlling the operation of SNB 501, communicates with other processors in the communication system through the packet-switching capability of CSN 400. For this purpose, a packet inserter 907 follows elastic store 906. It allows microprocessor 905 to insert packets which it is transmitting to other processors into the received data stream. Packet inserter 907 momentarily buffers incoming packets to allow infrequent microprocessor 905 packets to slip into the data stream. After a microprocessor 905 packet has been inserted, the buffered packets from link 102 or 602 are again allowed to proceed. Packet inserter 907 is the equivalent of packet inserter 222 of CSI 212.

The received data stream, along with any packets slipped in by packet inserter 907, is transmitted on the SNB's own data bus 901, by a conventional bus driver circuit 908. Illustratively, each SNB 501 transmits on each data lead of its own data bus 901 at 4.096 Mbps. With 16 data buses 901 each being illustratively 8 data bits wide, there is a total of 128 data-conducting data leads, each carrying information at 4.096 Mbps. Thus, the maximum data bandwidth of backplane bus 504 is 524 Mbps. In addition to data (D) field 313 of a time slot, each SNB 501 also transmits the identity (I) and parity (P) bits 312 and 314 of each time slot—for a total of 10 bits—and a frame clock signal based on the appearance of the first time slot of a frame as identified by framing (F) bit 310, each on its dedicated lead of bus 901.

Most work of SNB 501 occurs on its transmit side 903. Here, SNB 501 functions as a 16:1 integrated circuit-and-packet multiplexer. When an SNB 501 is coupled with 15 other SNBs in an NSN 401, an integrated non-blocking circuit switch and high-performance packet switch for 16 communication links is created. All 160 data leads plus 16 frame clock leads on backplane bus 504 are listened to by both the packet and circuit switching functions on each SNB 501, through conventional receivers 919. Each receiver 919 serves a different bus 901.

Sixteen circuit switcher data stores 920 on SNB transmit side 903 continuously fill their 512 10-bit memory locations, each with the 8-bit parallel data field plus I and P bits from a different data bus 901. Addresses for storage of data within a data store 920 are generated by that store's 9-bit counter (not shown), which is reset by the frame clock signal of the connected data bus 901. Each data store 920 is the equivalent of data store 225 of CSI 212. Since each data store 920 handles a unique data bus 901, each fills with the data field from one of the 16 SNBs 501 in the NSN 401, including its own. Data is removed from data stores 920 by a time-slot formatter 930 under control of a control RAM 942.

Sixteen packet switchers 921 on SNB 501 transmit side 903 each continuously monitors the packet traffic—identified by the I-bit within each time slot—on its connected data bus 901. Each switcher 921 compares the first valid address of the routing vector of a received packet with the board address of the SNB 501 that the packet switcher 921 is a part of. A matching address causes the associated packet to be buffered and its CRC checked by the receiving packet switcher 921. Packets whose destination is the SNB's connected link 102 or 602 are buffered separately, in link buffers 941, from packets destined for the SNB's microprocessor 905, which are buffered in microprocessor buffers 940. Each packet switcher 921 and associated buffers 940 and 941 are the equivalent of packet switcher 221 and buffers 241 and 242 of CSI 212. Microprocessor buffer 940 of each of the 16 packet switchers 921 is polled by microprocessor 905 for queued messages. Similarly, time-slot formatter 930 polls link buffer 941 in each packet switcher 921 and transfers packets from buffers 941 into a common packet FIFO buffer 943. This large FIFO buffer 943 is filled by formatter 930 from link buffers 941 of the 16 packet switchers 921 on a first-come/first-served basis. FIFO buffer 943 is the equivalent of FIFO buffer 232 of CSI 212.

Time-slot formatter 930 meters out circuit and packet information from data stores 920 and FIFO buffer 943 to fill the bandwidth of the out-bound link 102 or 602 with circuit-switched and packet-switched information. Time-slot formatter 930 contains a 512-word circuit switch and packet multiplexer control RAM 942, which is written by the microprocessor 905 as it sets up and takes down circuit-switched connections to link 102 or 602. Time-slot formatter 930 is the equivalent of formatter 231 of CSI 212, while control RAM 942 is the equivalent of control RAM 243 of CSI 212. The contents of control RAM 942 are cycled through sequentially, once per frame. Time-slot formatter 930 receives a basic clock signal from SNC 500 and uses it to generate its own frame clock for cycling through RAM 942; formatter 930 also provides the frame clock signals to link interface 904. The content of each control RAM 942 location is applied as an address to the 16 circuit switcher data stores 920. For each out-bound link 102 or 602 time slot, any location in any of the 16 data stores 920 may be read, inserted into the data field of the time slot, and passed to the transmit side of link interface 904. For many time slots, no data store 920 is accessed, and packet information from FIFO buffer 943 is inserted in the data field of that time slot instead.

The transmit side of link interface 904 accepts time slots from time slot formatter 930 for transmission over link 102 or 602. Link interface 904 inserts the framing information, which it also receives from formatter 930, before transmitting the time slots. As was mentioned above, link interface 904 is the equivalent of link interface 223 of CSI 212.

Using the above-described facilities, CSN 400 logically comprises three independent communication networks: a circuit-switched network that provides connectivity for circuit-switched information; an end-to-end self-routing packet-switched network that provides wideband connectivity for packet-switched user information and inter-SPE 104 communications; and a control network used for controlling CSN 400 itself—CSN 400 is a distributed system and has no central point of control.

The control of, and routing within, a self-routing packet network are well-known in the art and hence will not be discussed further herein. An illustrative example thereof is found in U.S. Pat. No. 4,488,288.

The control network is used to control the circuit-switched network and the routing of circuit-switched communications therethrough. That control network and its operation are discussed below.

The control network is a distributed data communications network which provides OSI data link layer, network layer, and application layer services to network switching/control elements, i.e., SPEs 104, CSIs 212, and SNBs 501. The data link layer uses the LAPD protocol to provide a synchronous data transport mechanism for carrying packets between adjacent network elements. The network layer uses store-and-forward techniques to provide end-to-end routing for application layer messages. The application layer, in turn, provides capabilities such as circuit path setup and release.

When the system of FIG. 7 is powered up, the control network is collectively established by and between adjacent CSIs 212 and SNBs 501. SPEs 104 also establish access links into the control network at this time. The control network then uses the store-and-forward techniques to pass control messages from one network element to the next. At each element, the control messages are processed and then forwarded along a prescribed path, contained in the message, through CSN 400.

Figure 14:
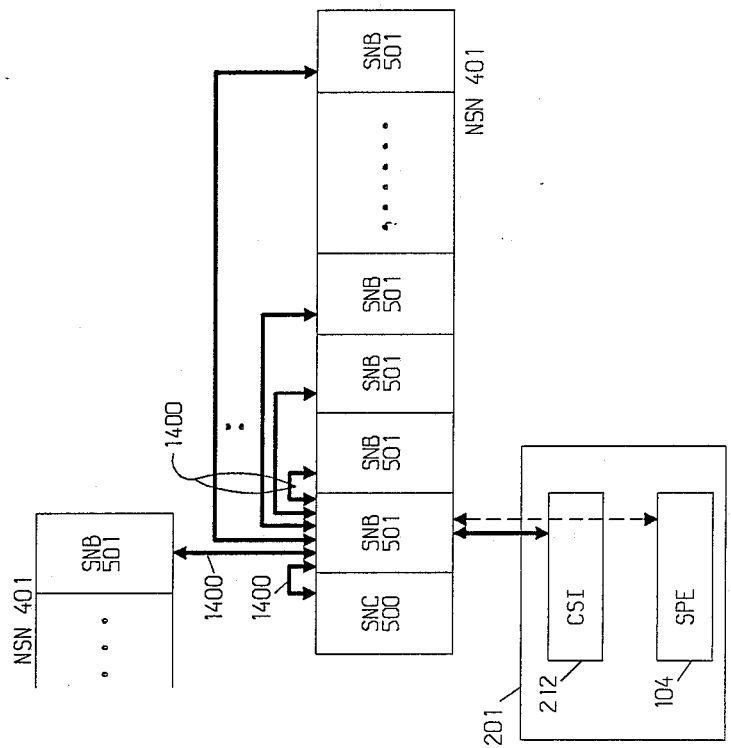
FIG. 14 is a diagram of illustrative logical links of a control network of the system of FIG. 7.

The network elements create the store-and-forward control network by each establishing LAPD logical links between themselves and adjacent network elements. More specifically, each SNB 501 establishes a logical link to each other SNB 501 in the same NSN 401, as well as to the SNB 501 or CSI 212 at the far end of its TDM link 602 or 102. Furthermore, each SPE 104 establishes a logical link into the control network via its CSI 212. This control network link terminates on the SNB 501 to which the CSI 212 is connected. SPE 104 uses this link for injecting messages into and receiving messages from the control network. All of these logical links use the multiple-frame procedures of the LAPD protocol. All possible LAPD logical links 1400 for an SPE 104, CSI 212, or a single SNB 501 are illustrated in FIG. 14. Note that both neighbor links—between an SNB 501 and CSI 212, and between that SNB 501 and the SNB 501 of another NSN 401—cannot simultaneously exist for a single SNB 501.

SNBs 501 and CSIs 212 have no global configuration knowledge of the system of FIG. 7. Consequently, all routing decisions are made by SPEs 104. Control messages are generally injected into the control network by an SPE 104, are routed through the control network by traversing the LAPD links within and between switch nodes 401, and are received from the control network by another SPE 104. Within each message, there is a destination route that prescribes the end-to-end route through the network that the message should follow. When the message reaches the element at the end of the prescribed route, the message is processed. The contents of the message may also contain high-level routing information that can be used to perform further routing of the message after it has been processed. Messages may be modified as they pass through the control network, depending on the application.

Figure 13:
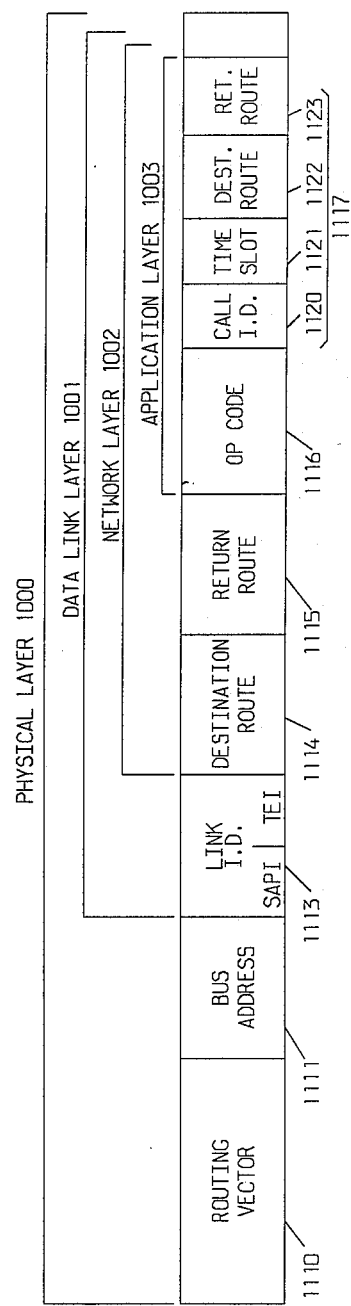
FIG. 13 is a block diagram of the structure of a control packet of the system of FIG. 7.

Communications through the control network proceed by way of packets, the general configuration of which is shown in FIG. 13. The shown configuration is a collapsed view of the various OSI levels that are used. Not all layers need be used for every communication.

The lowest layer packet is the physical layer packet 1000. It includes a plurality of fields 1110–1111 and 1001, as well as other fields, such as conventional delimiter flag fields and frame check sequence fields, that are not germane to an understanding of how the control network operates and hence are not discussed herein. Routing vector field 1110 comprises one or more bytes each one of which specifies the physical address of the next hop, i.e., network element, in the packet's route. Each byte has one of 18 possible values, 16 of which specify a particular SNB 501 within an NSN 401, one of which specifies a CSI 212, and the last one of which specifies a PKT bus 202. Any number of bytes may be included in field 1110 to identify any target network element.

Bus address field 1111 is unused except for communications between an SPE 104 and an element of CSN 400. When a routing vector 1110 byte specifies a PKT bus 202 as the target, bus address field 1111 specifies in conjunction therewith the board and port address of SPE 104 on the PKT bus 202.

Routing vector field 1110 and bus address field 1111 are also the addressing fields used by the self-routing packet network to specify the end-to-end route of a packet through the system of FIG. 7.

Data field 1001 of physical layer packet 1000 is occupied by the next-layer data structure—a data link layer frame 1001. Frame 1001 includes a link I.D. field 1113 and a data field 1002, as well as other fields not germane to this discussion. Link I.D. field 1113 is composed of a pair of data link identifier bytes SAPI and TEI, each one of which by convention uniquely identifies a different one of the two endpoints—network elements—of a LAPD link, and thereby uniquely identifies the LAPD link. Together, the two data link identifier bytes form the LAPD data link connection identifier (DLCI). The data link identifier bytes also distinguish between peer links—those that interconnect SNBs 501 within a single NSN 401—and neighbor links—those that extend between adjacent elements through TDM links 102 or 602—to facilitate correct acknowledgment of received frames and detection of when a received frame should be ignored. Link I.D. field 1113 provides the receiving endpoint with information on which was the originating endpoint, and hence on where to send the acknowledgment.

Data field 1002 of data link layer frame 1001 is occupied by the next-layer data structure: a network layer message 1002. The network layer makes use of the bi-directional LAPD data links that exist between adjacent network elements at the data link layer to route messages from one element to another, not necessarily adjacent, element. These data links form a store-and-forward network that can be used to route messages to any point in the network. The network layer mimics the message routing done by the hardware. Message 1002 includes two route fields 1114 and 1115 and a data field 1003, as well as other fields not germane to this discussion. Destination route field 1114 comprises a sequence of bytes that determine the message path through the network and thereby specify the intended recipient of the message. Return route field 1115, on the other hand, comprises a sequence of bytes that determine the message path back to the message originator. The return route is used in returning a reply to the originator of the message. Fields 1114 and 1115 are shifting fields: field 1114 specifies the route to the message recipient from whatever point in the network the message is presently at, while field 1115 specifies the return route to the message originator from the same point; as a destination route byte is used, a complementary return route byte is added to the return route. A route byte is required for each NSN 401 and CSI 212 or SPE 104 to or through which the message will be routed. The route byte for an NSN 401 specifies where the message is to be forwarded upon receipt from outside of the NSN 401. The route byte for a CSI 212 or SPE 104 specifies what the CSI 212 or SPE 104 is to do with the message (i.e., process it, forward it, or even discard it).

Figure 18:
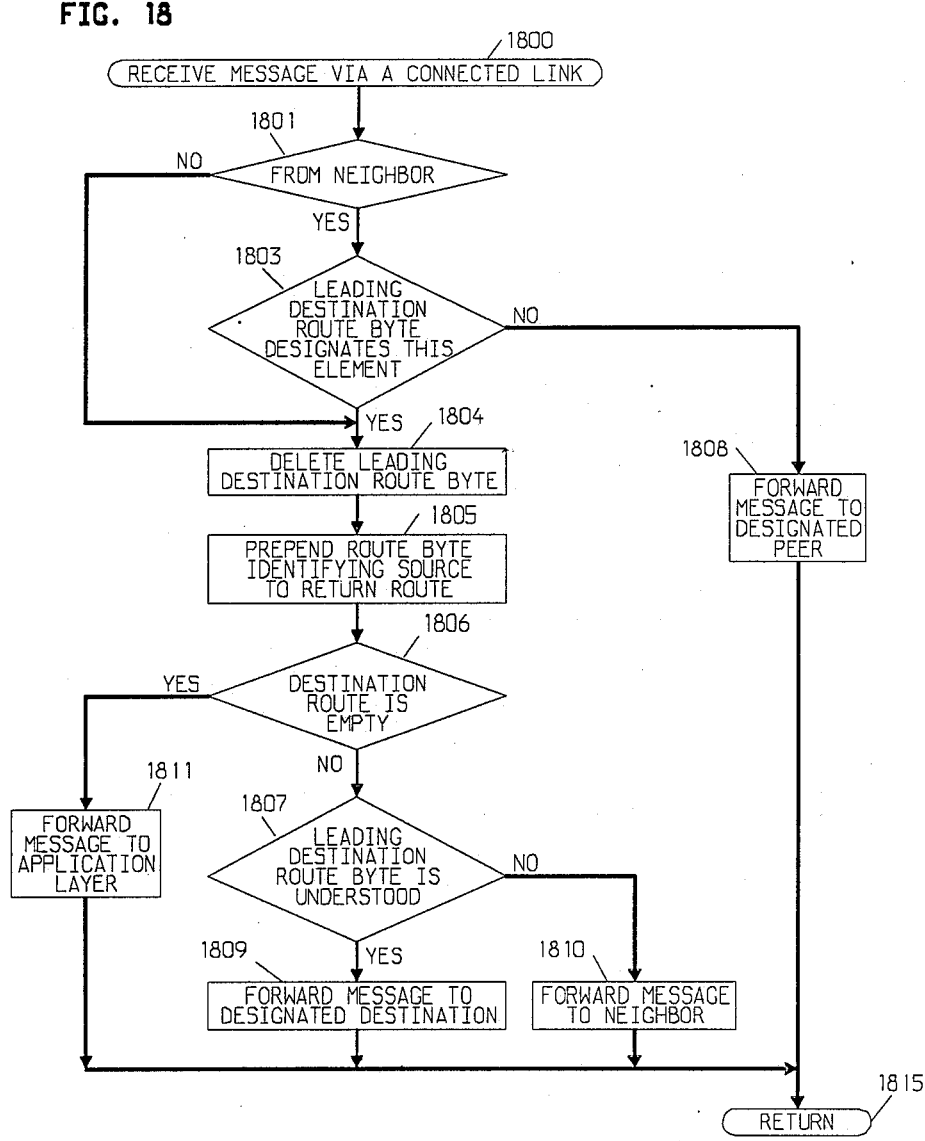
FIG. 18 is a flow diagram of the operations of an SNB in processing the route fields of the control packet of FIG. 13.

The essence of network layer operations is contained in what happens when a message is received by a microprocessor 905 or 220. This is illustrated in FIG. 18. If the message is received from a neighbor, as determined at step 1801, the leading byte of the destination route field 1114 is examined to determine whether it designates the receiving element, at step 1803. If not, the message is forwarded to the peer designated by the leading route byte, at step 1808, and the function returns, at step 1815. If the leading destination route field 1114 byte is found at step 1803 to designate the receiving element, the leading destination route field 1114 byte is deleted, at step 1804, and a byte is prepended to the beginning of the return route field 1115 that identifies the element from which the message was received, at step 1805.

Returning to step 1801, if it is determined there that the message is received from a peer, operation immediately proceeds to step 1804. Following step 1805, destination route field 1114 is examined to determine if it is empty, at step 1806. If so, the message is passed to the application layer in the receiving element, at step 1811, and the function returns, at step 1815. If destination route field 1114 is not empty, the new leading destination route field 1114 byte is examined, at step 1807. If that byte is a special encode that the receiving element understands, the message is forwarded to the designated destination, at step 1809; if not, the message is forwarded to the neighbor, at step 1801. The function then returns, at step 1815. The procedure is repeated at each element to which the message is forwarded, until destination route field 1114 is empty, at which time the message is passed to the application layer in the receiving element.

The network layer is not used by the self-routing packet network.

Data field 1003 of network layer 1002 is occupied by the next-layer data structure: an application layer message 1003. Message 1003 includes two fields relevant to this discussion: an opcode field 1116 and a data field 1117. Opcode field 1116 specifies the purpose of the message, such as circuit path setup or release, while data field 1117 provides the relevent parameters.

For the purposes of circuit-path setup and release, data field 1117 is divided into a plurality of fields 1120–1123, plus other fields not germane to this discussion. Call I.D. field 1120 carries an identifier that uniquely identifies to SPEs 104 the call for which the path is being set up or released. Time-slot field 1121 identifies the particular TDM link 102 or 602 time slot that is to carry, or is carrying, the call. And destination route field 1122 and return route field 1123 correspond to fields 1114 and 1115 of the same name of network layer 1002; application layer 1003 route specifications work the same way as network layer 1003 route specifications, which have been described above in conjunction with FIG. 18.

The application layer is not used by the self-routing packet network.

Figure 19:
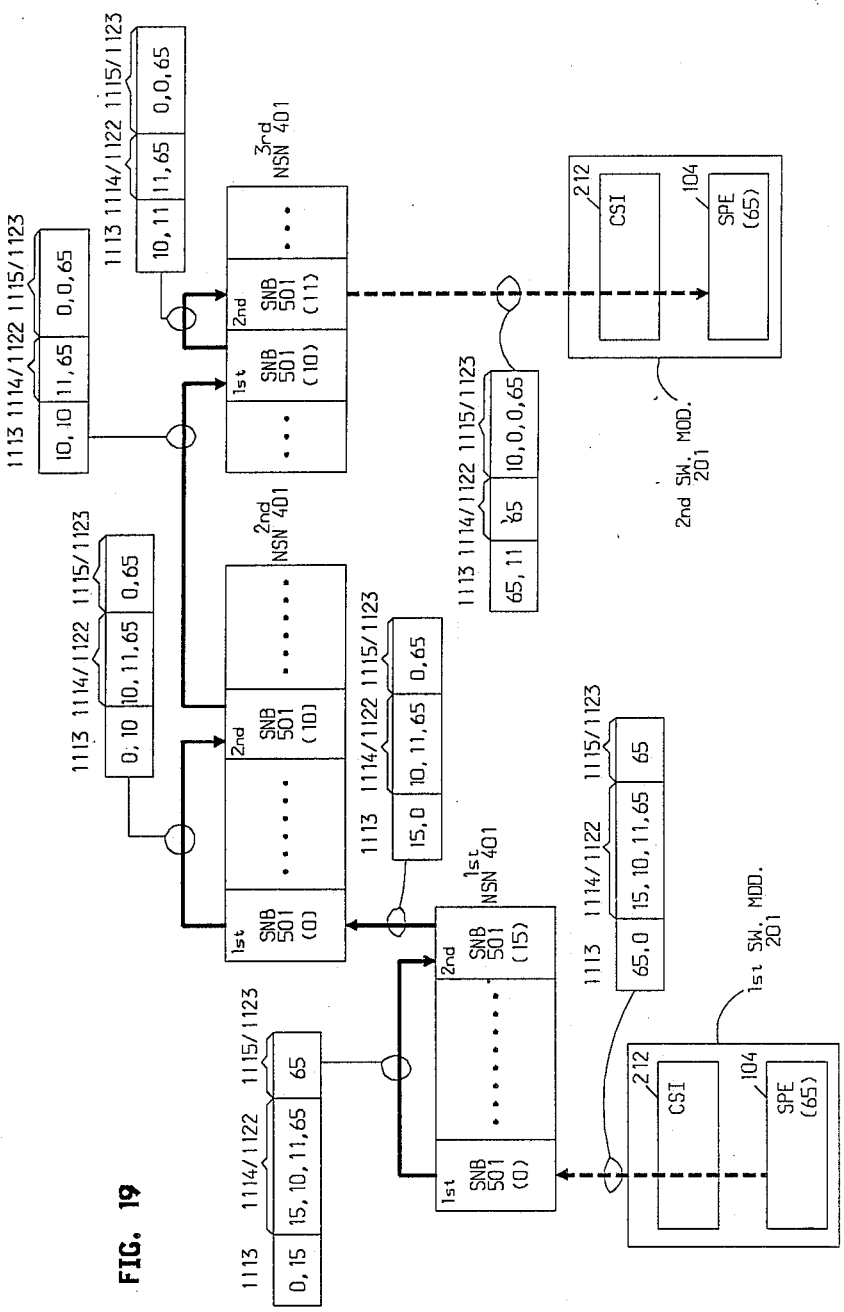
FIG. 19 is an illustrative example of the route field processing accomplished in FIG. 18.

At this point, it may be helpful, for an understanding of how the data link, network, and application layer routing arrangements work, to consider an example thereof, presented in FIG. 19. FIG. 19 shows a hierachical CSN 400 comprising three NSNs 401 interconnecting a pair of switching modules 201. Each number shown in parentheses is the data link identifier byte—the DLCI byte—that is associated with the shown SPE 104 or SNBs 501. FIG. 19 presents the example of a message originated by SPE 104 of the first switching module 201 and either (a) intended for receipt by SPE 104 of the second switching module 201, if network layer 1002 route fields 1114 and 1115 are used, or (b) intended for receipt by the application layer of every SNB 501 that receives the message over a connected logical link, as well as by SPE 104 of the second switching module 201, if application layer route fields 1122 and 1123 are used. The arrows shown in FIG. 19 represent the LAPD logical links specified by values of link I.D. 1113 of the message and traversed by the message. For each shown link, FIG. 19 shows the value of link, I.D. 1113 and the values of the route fields of either one of the (a) network layer or (b) application layer.

SPE 104 of the first switching module 201 transmits the message through CSI 212 to the first SNB 501 of the first NSN 401 with link I.D. field 1113 having data link identifier bytes of SPE 104 and its indirect neighbor SNB 501, and the network or application layer destination route field 1114 or 1122 specifying the route of the message through the three shown NSNs 401. Return route field 1115 or 1123 identifies SPE 104 of the first switching module 201 by its network layer I.D. Furthermore, the two data link identifier bytes are arranged will respect to each other in descending numerical order to identify a neighbor link, as opposed to ascending order which identifies a peer link.

The first SNB 501 of the first NAN 401—the CSI's neighbor SNB 501—receives the message over TDM link 102, automatically retransmits it on its data bus 901, receives it from its data bus 901, and determines, on the basis of routing vector 1110, link I.D. field 1113 specifying a neighbor link, and the fact that it received the message on its own data bus 901, that it is the intended recipient. The other SNBs 501 of the first NSN 401 also receive the message over data bus 901, but determine from the message's routing vector 1110 that they are not intended recipients, and hence discard the message. Microprocessor 905 of the first SNB 501 of the first NSN 401 determines from the fact that the first byte of destination route field 1114 or 1122 does not identify this first SNB 501, that is function is merely to pass the message on to the second SNB 501 of the first NSN 401. It places in link I.D. 1113 its data link identifier byte and that of the destination peer SNB 501, in ascending numerical order to identify a peer link, thereby specifying the logical link that connects them. SNB 501 then transmits the message on its data bus 901.

All SNBs 501 of the first NSB 401 receives the message from data bus 901, but only the second SNB 501 determines, from routing vector 1110, link I.D. field 1113 identifying a peer link, and the fact that it did not receive the message on its own data bus 901, that it is the intended recipient; all other SNBs of the first NSN 401 ignore and discard the message on the basis of routing vector 1110. Microprocessor 905 of this second SNB 501 determines, from the fact that the second SNB 501 is identified by the first byte of destination route field 1114 or 1122, that it is to process the message—at the network or application layer, depending upon whether route field 1114 or 112 is used—and does so. From that same route field not being empty, microprocessor 905 also determines that it is not the final recipient of the message, but that it must pass the message on. It therefore places in link I.D. field 1113 its data link identifier byte and that of its neighbor SNB 501 in the second NSN 401, in descending numerical order to identify a neighbor link, thereby specifying the logical link that connects them. Microprocessor 905 also discards the first byte of the destination route field 1114 or 1122, which identifies the second SNB 501 of the first NSN 401 and hence is used up, and prepends the identifier of its peer SNB 501 from which it received the message, i.e., the first SNB 501 of the first NSN 401, as the new leading byte of return route field 1115 or 1123. The second SNB 501 of the first NSN 401 then transmits this modified message on its own data bus 901.

Again, all SNBs 501 of the first NSN 401 receive the message, but only the second SNB 501 determines from routing vector 1110 that it is the intended recipient of the message, but only in the retransmitter. The second SNB 501 of the first NSN 401 therefore transmits the message over TDM link 602 that connects it to the second NSN 401.

At the second NSN 401, the msssage is treated identically to how it had been treated at the first NSN 401. In particular, the message is first received by the first SNB 501 of the second NSN 401, which treats the message identically to how it had been treated by the first SNB 501 of the first NSN 401. This results in the message acquiring a new value for its link I.D. field 1113, to identify the peer link between the first and second SNBs 501 of the second NSN 401, and being passed to the second SNB 501 of the second NSN 401. Here, the message is treated identically to how it had been treated by the second SNB 501 of the first NSN 401. The message loses the first, and now used up, byte of its destination route field 1114 or 1222, gains a new leading byte of its return route field 1115 or 1123 to identify the first SNB 501 of the second NSN 401, and also gains a new value for its link I.D. field 1113 to identify the neighbor link extending between the second SNB 501 of the second NSN 401 and the first SNB of the third NSN 401. The message is then fowarded by the second SNB 501 of the second NSN 401 to the first SNB 501 of the third NSN 401.

At the first SNB 501 of the third NSN 401, the message is handled identically to how it had been handled by the first SNBs 501 of the other NSNs 401. In particular, the message acquires a new value for its link I.D. field 1113 and is forwarded to and received by the second SNB 501 of the third NSN 401. At the second SNB 501 of the third NSN 401, the message is handled identically to how it had been treated by the second SNBs 501 of the other NSNs 401. In particular, the message loses the first, and now used-up, byte of its destination route field 1114 or 1122, gains a new leading byte of its return route field 1115 or 1123 to identify the source peer SNB 501, and gains a new value for its link I.D. field 1113 to identify the destination indirect neighbor SPE 104. The message is then forwarded to SPE 104 of the second switch module 201 through that module's CSI 212.

SPE 104 of the second switch module 201 engages in the same type of processing of the message's address field as had been engaged in by the first SNBs 501 of the NSNs 401. At this point, however, all bytes of destination route field 1114 or 1122 have been used up, so SPE 104 knows that the message has reached its final destination. The message is therefore merely passed to the application layer by the receiving network layer, or is merely retained by the application layer if it was the initial recipient.

To establish the control network of logical links, each network element initializes LAPD links to each of its peers and neighbor (see FIG. 14); when power is supplied to a network element, it begins a prescribed set of operations to establish the required logical links. The specific operations are a function of the type of element. The initialization takes place at the level of the data link layer of FIG. 13. The link initialization procedures are diagrammed in FIGS. 15–17.

Since any given network element has no a priori knowledge of what adjacent elements are present, and also to accommodate the possibility that different parts of system of FIG. 7 may be powered up at different times, a strategy of periodically re-attempting to establish any possible logical links that have not been established is employed by all network elements. This also ensures that, if a logical link should ever fail, it will be re-established promptly.

Figure 15:
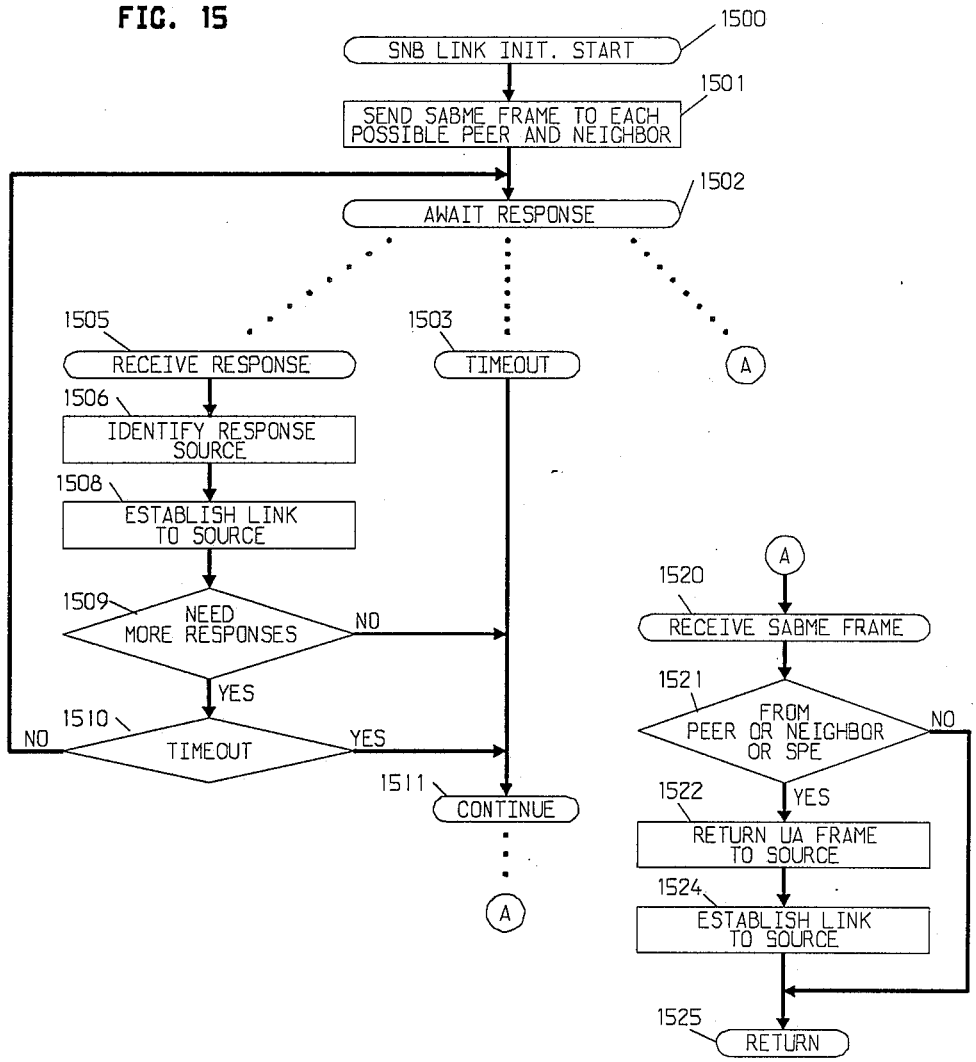
FIG. 15 is a flow diagram of the operations of an SNB in initializing the links of FIG. 14.

The link initialization procedure for SNBs 501 is shown in FIG. 15. Microprocessor 905 of an SNB 501 attempts to establish a logical link to each extant peer by sending a LAPD link initialization command (SABME) to each possible peer. It does this by sending a series of SABME frames across its data bus 901, one addressed to each possible peer, at step 1501. Each SABME frame contains the routing vector 1110 of one of the peer SNBs 501 and data link identifier bytes within link I.D. field 1113 identifying the source and destination SNBs 501. Furthermore, the two data link identifier bytes are arranged with respect to each other in ascending numerical order to indicate that this is an attempt at initialization of a link to a peer, as opposed to descending numerical order which identifies a neighbor link. SNB 501 also attempts to establish a logical link to its neighbor. But since it has no a priori knowledge of what its neighbor's address is, it must attempt to establish a link to each possible neighbor. SNB 501 does not this by sending a SABME frame to each possible neighbor, at step 1501. Each of these SABME frames contains a two-byte routing vector: the first byte is the board address of the SNB 501 that is sending the SABME and the second byte contains the board address of a possible target neighbor. Data link identifier bytes within link I.D. field 1103 identify the source SNB 501 and the target neighbor. Furthermore, the two data link identifier bytes are arranged with respect to each other in descending numerical order to indicate that this is an attempt at initialization of a link to a neighbor. Equal numerical values of the two data link identifier bytes also indicate an attempt at initialization of a link to a neighbor, as two peers cannot have the same data link identifier byte values.

Following the sending of each SABME frame, SNB 501 uses a time-out mechanism waiting for an unnumbered acknowledgement (UA) responses to the SABME frame, at step 1502, to determine the existence of the target element. If no response is received within the timeout period, as shown at step 1503, the target element is assumed not to exist, and SNB 501 continues with other activities, at step 1511.

If a response is received within the timeout period, at step 1505, SNB 501 identifies from the link I.D. bytes of the response the element that was the source of the response, at step 1506, and establishes a LAPD link to the source element at step 1508. (According to the LAPD protocol, receipt of a UA on an already-established link is effectively ignored.) SNB 501 then checks whether it has recieved responses to all SABME frames that it had sent out, or whether more responses are needed, at step 1509. If no more responses are needed, link initialization is complete and SNB 501 continues with other activities, at step 1511. If more responses are needed, SNB 501 checks for expiration of the timeout period, at step 1510. If it has expired, SNB 501 proceeds to step 1511; if it has not expired, SNB 501 returns to step 1502.

In general, each SNB 501 receives many SABME frames, at step 1520, some of which it must respond to and others of which it should ignore. SNB 501 determines whether a received SABME frame came directly from a peer or neighbor, or an indirect neighbor, i.e., an SPE 104, at step 1521, or whether it came from a peer's neighbor. SNB 501 determines the origin of a frame by examining link I.D. field 1113 and by determining whether the frame was received over the SNB's own TDM link 102 or 602, i.e., over its own bus 901. If the data link identifier bytes of link I.D. field 1113 indicate an attempt to initialize a neighbor link and the frame did not come over the SNB's own link, then the frame must have come from a peer's neighbor. All frames from a peer's neighbor are ignored, and so SNB 501 merely returns, at step 1525, to activities that preceded receipt of the SABME frame at step 1520. If data link identifier bytes of link I.D. field 1113 indicate an attempt to initialize a peer link, or if they indicate an attempt to initialize a neighbor or indirect neighbor link and the frame was received over the SNB's own TDM link 102 or 602, then SNB 501 must respond to it. SNB 501 responds by sending a LAPD unnumbered acknowledgement (UA) frame to the SABME frame's originator, at step 1522. The data link identifier bytes of link I.D. field 1113 of the received SABME frame are used to determine the routing vector for the UA frame. SNB 501 then establishes the link to the source element, at step 1524. (According to the LAPD protocol, receipt of a SABME on an already-established link—see step 1508—restarts—re-establishes—the already-existing link.) SNB 501 then returns, at step 1525.

Figure 16:
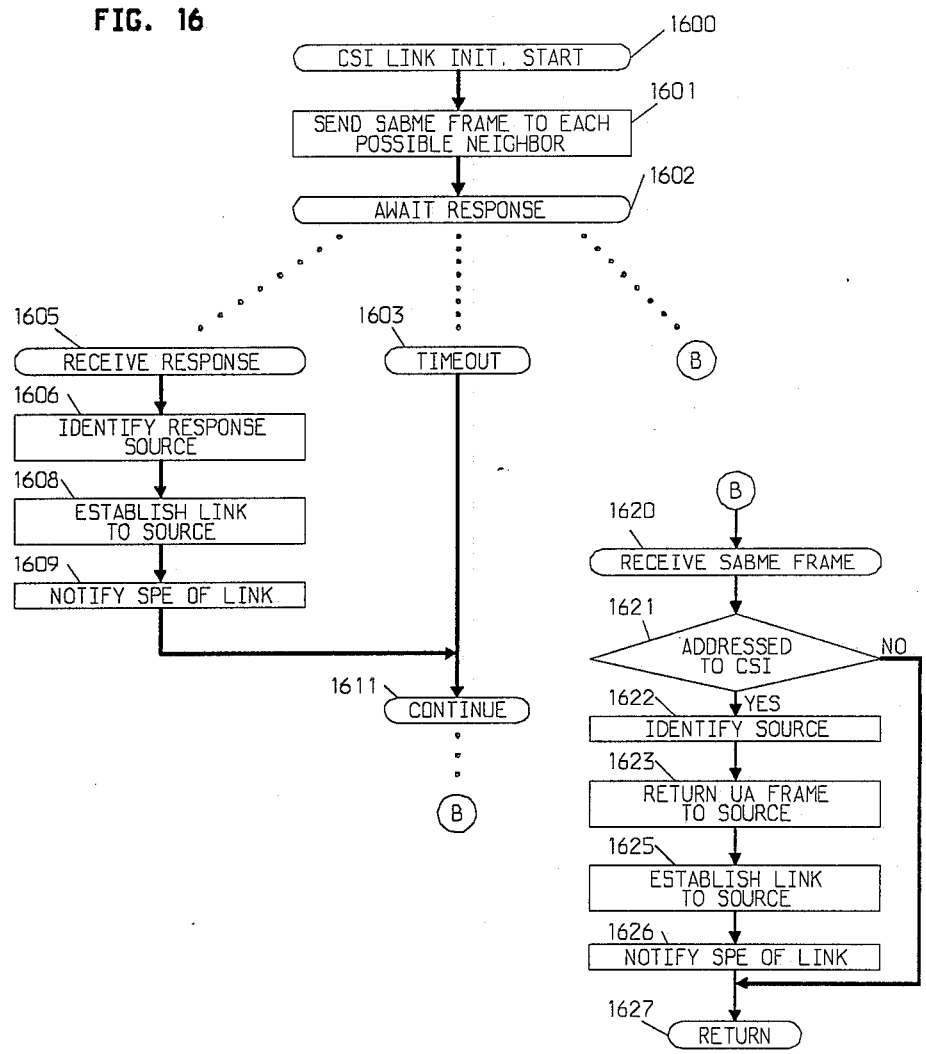
FIG. 16 is a flow diagram of the operations of a CSI in initializing the links of FIG. 14.

The link initialization procedure for CSIs 212 is shown in FIG. 16. Microprocessor 220 of a CSI 212 tries to initialize a logical link to its neighbor by sending SABME frames over TDM link 102 with routing vectors addressing every possible SNB 501 and another CSI 212, at step 1601. The data link identifier bytes of link I.D. field 1113 of each SABME frame identify the originating CSI 212 and the intended target.

Following the sending of the SABME frames, CSI 212 uses a time-out mechanism waiting for a UA response to one of the frames, at step 1602, to determine the existence and identify of the target element. If no response is received within the timeout period, as shown at step 1603, a target elment is assumed not to exist, and CSI 212 continues with other activities, at step 1611.

If a response is received within the timeout period, at step 1605, CSI 212 identifies from the response the element that was the source of the response, at step 1606, and establishes a link to the source element, at step 1508. (According to the LAPD protocol, receipt of a UA on an already-established link is ignored.) CSI 212 also notifies SPE 104—either local, if it exists, or remote—of the existence of that link, at step 1609. Only the true neighbor will respond with a UA frame, so that only one logical link will be established. Hence, following step 1609, link initialization is completed and CSI 212 continues with other activities, at step 1611.

When CSI 212 receives a SABME frame, at step 1620, it checks whether the frame is addressed to it, as determined from data link identifier bytes of link I.D field 1113, at step 1621. If not, CSI 212 ignores the frame and returns to its previous activities, at step 1627. If the frame is addressed to CSI 212, it responds by determining from the frame the network element which originated the SABME frame, at step 1622, and sending a UA frame to the originating element, at step 1623. If the SABME frame was received from a SNB 501, then the routing vector sent with the UA frame contains the data link identifier byte of the source of the SABME frame; if the SABME frame was received from another CSI 212, then the routing vector sent with the UA frame contains an identifier of the source CSI 212. CSI 212 then establishes a link to that element, at step 1625. (According to the LAPD protocol, receipt of a SABME on an already-existing link restarts the link.) After CSI 212 has established a logical link to its neighbors, it notifies the controlling SPE 104 by sending it a message, at step 1626, that specifies the neighbor's data link layer address—the address that was used with the UA frame. CSI 212 then returns, at step 1627, to its activities that preceded receipt of the SABME frame at step 1620.

Figure 17:
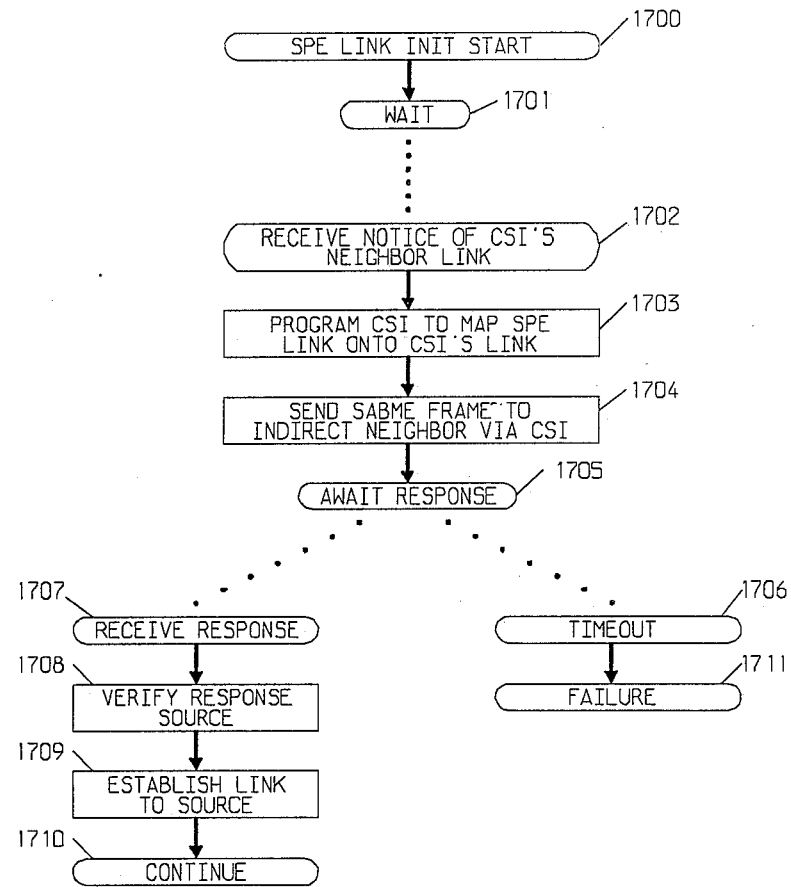
FIG. 17 is a flow diagram of the operations of an SPE in initializing the links of FIG. 14.

The link initialization procedure for SPEs 104 is shown in FIG. 17. An SPE 104 establishes a link to its indirect neighbor SNB 501 by using the indirect neighbor's data link layer address, which it obtains from CSI 212. Hence, SPE 104 must wait, at step 1701, for receipt of notification from CSI 212, at step 1702, of establishment of a link to the CSI's neighbor. SPE 104 then programs the CSI's translation RAM so that a chosen link I.D. is mapped, via the routing vector, to the indirect neighbor SNB 501, at step 1703. That is, the routing vector contains the indirect neighbor SNB's board address. The translation RAM is also programmed to contain the SPE's PKT bus 202 board address in the bus address field 1112. SPE 104 then establishes the logical link to its indirect neighbor by sending a SABME frame with the chosen link I.D. to the CSI 212, at step 1704. SPE 104 then uses a time-out mechanism waiting for a UA response to the SABME frame, at step 1705.

Translation RAM uses the chosen link I.D. to find and prepend the routing vector and the bus address field to the SABME frame, and the frame is then transmitted by CSI 212 on TDM link 102. When the indirect neighbor SNB 501 receives the SABME frame, at step 1520 of FIG. 15, it returns a UA frame to SPE 104 via CSI 212, at step 1522, using the bus address from the received SABME frame. SNB 501 also saves the contents of the bus address field for use whenever the SNB 501 sends a frame to SPE 104, at step 1524.

If no UA response is received by SPE 104 within the timeout period, as shown at step 1706, a target element is assumed not to exist, and SPE 104 exits in a failed mode, at step 1711. If a UA response is received within the timeout period, at step 1707, SPE 104 verifies from the response the identify of the responding SNB 501, at step 1705, and establishes a link to that SNB 501, at step 1709. SPE 104 then continues with other activities, at step 1710.

The control network supports various applications, including system synchronization, system management and maintenance, and call processing. The one application of interest here is circuit-switched network circuit-path setup and release. This application provides the means for an SPE 104 to establish and to tear down a one-way circuit-switched connection from one switch module 201 to another switch module 201. Two such connections, one in each direction, are required for a typical, two-way circuit-switched call. It works was follows.

Turning momentarily to FIG. 7 and assuming that each switch module 201 has an SPE 104, when a port 106 or 206 (see FIG. 2) originates a call on TDM bus 103 of a switch module 201, SPE 104 of that originating switch module 201 detects the origination and determines its destination in a conventional manner. If the destination is determined to be within another switch module 201, SPE 104 of originating module 201 forms a message—a packet—for destination module 201, informing it of the call origination and of the call's intended destination and identifying the call by a unique call I.D. This message includes a CSI 212 link I.D. field 1113 (see FIG. 13), and includes the other information in field 1003. SPE 104 of originating module 201 then sends the message over PKT bus 202 to CSI 212 of originating module 201 for transmission to destination module 201.

Translator 230 of CSI 212 (see FIG. 4) receives the message and uses the CSI link identifier to find in its translation RAM, and to retrieve therefrom, routing vector field 1110 and bus address field 1111 for SPE 104 of destination module 201, and a link identifier 1113 identifying SPEs 104 of originating and destination modules 201, and prepends these as fields 1110, 1111, and 1113 to the message. CSI 212 then sends the message to destination module over the self-routing packet network.

Each switch module 201 and SNB 501 controls outgoing time slots on its connected TDM link 102 or 602. When SPE 104 of destination module 201 receives the above-described message and determines that the call identified thereby can be completed. it responds thereto by selecting a time slot on its TDM link 102. SPE 104 then sends a message to CSI 212 of destination switch module 201, through their TDM bus 103 control communication channel, mentioned previously, to cause microprocessor 220 to program control RAM 243 such that it will cause time-out formatter 231 to connect whatever TDM bus 103 time slot the call will be appearing on to the selected time slot of TDM link 102.

At this time, SPE 104 also forms a circuit-path setup message—again, a packet—for injection into the control network. Field 1116 of this message has an opcode of CP_SETUP to identify the message as a circuit-path setup message. Field 1120 includes the call I.D. that was provided by originating module 201 to identify the call. Time-slot field 1121 carries the number of the TDM link 102 time slot selected for this call by SPE 104 of destination module 201. Destination route field 1122 specifies the route through the system of FIG. 7 that the circuit-switched path should follow, while the return route field 1123 contains the data link identifier byte of the originating SPE 104. The destination route is generated by SPE 104 of destination module 201 on the basis of its knowledge of the configuration of the system of FIG. 7 and of which module 201 is the originating module. SPE 104 of destination module 201 has the latter knowledge from the originating module's identifier provided by originating module 201 in link I.D. field 1113 of the message which it sent to destination module 201. The route of the circuit-switched path is also the route that this circuit-path setup message follows from SPE 104 of destination module 201 through the control network to SPE 104 of originating module 201, and consequently, network layer 1002 route fields 1114 and 1115 are not needed or used. This message must be processed by each SNB 501 along the circuit-switched path, but not by either CSI 212. Hence, field 1113 contains the data link identifier bytes of SPE 104 of destination module 201 and of indirect neighbor SNB 501 to which destination module 201 is connected by TDM link 102, thereby identifying the control network LAPD link that this message traverse to reach its first stopping point along its route. SPE 104 of destination module 201 sends this message over the indirect neighbor link to the adjacent SNB 501.

Figure 20:
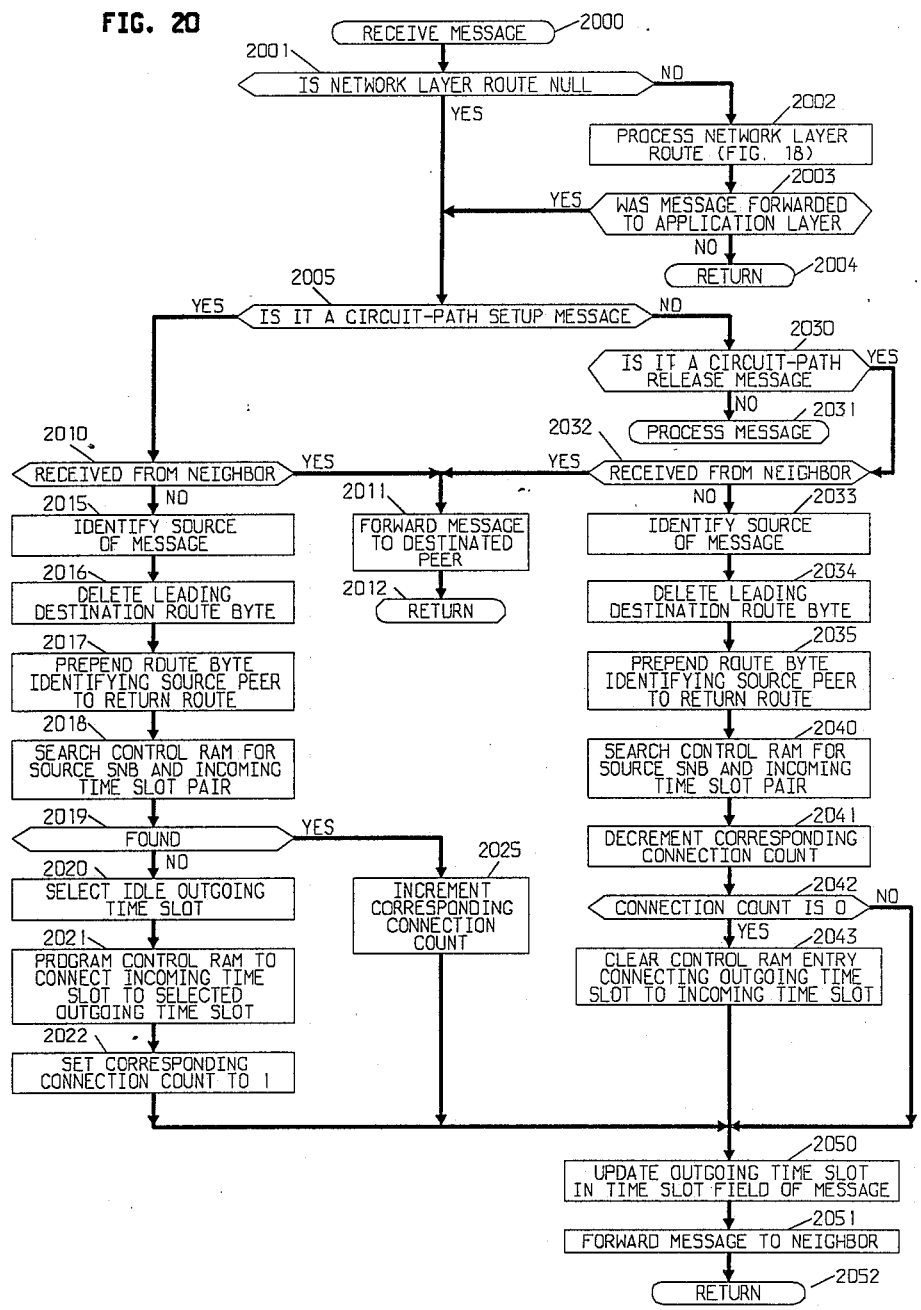
FIG. 20 is a flow diagram of the operations of an SNB in processing a circuit-path setup or release control packet of FIG. 13.

FIG. 20 illustrates the processing of a circuit-path setup or release message at an SNB 501. The message is received over TDM link 102 by link interface 904 of SNB 501 that is connected to TDM link 102 and is transmitted on the SNB's 501 data bus 901. Based on its routing vector 1110, it is received from data bus 901 by the same SNB 501, at step 2000—all other SNBs 501 in that NSN 401 ignore it. Based on the routing vector 1110, the message is sent to microprocessor 905 of that SNB 501. Microprocessor 905 checks whether network layer route fields 1114 and 1115 of this message are null, i.e., whether network layer routing is not being used, at step 2001.

If the network layer route fields are not null, i.e. network layer addressing is being used, microprocessor 905 processes the network-layer route of the message in the manner shown in FIG. 18, at step 2002. Following the processing of FIG. 18, microprocessor 905 checks, at step 2003, whether the message was forwarded to its own (i.e., its SNB's) application layer at step 1811 of FIG. 18. If not, the message has been forwarded, at the network layer, to another network element, i.e., to a peer or a neighbor and nothing else remains to be done, so microprocessor 905 returns to other activities, at step 2004. But if the check at step 2003 indicates that the message was forwarded to the microprocessor's own application layer, then application layer processing must be engaged in, and microprocessor 905 proceeds to do so, at steps 2005 et seq.

As mentioned above, call processing does not use network layer routing, so microprocessor 905 determines at step 2001 that the network layer route fields of the circuit-path setup message are null. This means that routing is being done at the application layer, and so microprocessor 905 proceeds to engage in application layer processing, at steps 2005 et seq.

At step 2005, microprocessor 905 checks field 1116 of the message to determine whether this is a circuit-path setup message. If so, microprocessor 905 checks whether the message was received from a peer of from a neighbor, at step 2010. (This step corresponds to step 1801 of FIG. 18.) If the message is determined to have been received from a neighbor, microprocessor 905 merely forwards the message to the peer designated by the first byte of the destination address, at step 2011. (This step corresponds to step 1808 of FIG. 18.) Microprocessor 905 is then done processing this message, so it returns to performing other tasks, at step 2012.

If microprocessor 905 determines at step 2010 that the message was received from a peer, it determines from which peer SNB 501 it had received the message, at step 2015. Next, microprocessor 905 rearranges route fields 1122 and 1123 to reflect the fact that its SNB 501 has already received the message, at steps 2016 and 2017. (These steps correspond to steps 1804 and 1805 of FIG. 18.) Microprocessor 905 then searches control RAM 942 to determine if any entry thereof already contains the I.D. of the source SNB identified at step 2015 and the call's incoming time slot identified by field 1121 of the received message, at step 2018. If microprocessor 905 finds such an entry in control RAM 942, as determined at step 2019, it means that a path for the call already exists, at least in part (e.g., it is a multi-point call, such as a conference call, logically made up of a plurality of point-to-point calls that share a path). Consequently, microprocessor 905 merely increments a connection count associated with that entry, at step 2025, to indicate that the outgoing time slot associated with that entry is carrying yet another connection. If microprocessor 905 does not find the sought-for entry at step 2019, it means that a path for the call does not exist, and microprocessor 905 sets about establishing one. First, microprocessor 905 selects an idle time slot on its connected TDM link 102 or 602, at step 2020. Microprocessor 905 then creates a control RAM 942 entry to cause the time slot specified by field 1121 of the circuit-path setup message, from data store 920 that is receiving time slots from data bus 901 of the peer SNB 501 from which microprocessor 905 received this circuit-path setup message, to be connected by time-slot formatter 930 to the selected outgoing idle time slot, at step 2021. An microprocessor 905 sets the entry's corresponding connection count to 1, at step 2022, to reflect that the corresponding outgoing time slot is presently serving only a single point-to-point call.

Following step 2022 or 2025, microprocessor 905 records the number of the selected outgoing time slot in time-slot field 1121 of the circuit-path setup message, at step 2050. From route field 1122, microprocessor 905 knows that the next stopping point of the circuit-path setup message is the neighbor network element, so it changes link I.D. field 1113 and routing vector field 1110 of the message to identify the LAPD link extending between its SNB 501 and the neighbor network element, and injects this modified message into the data stream out onto its SNB's 501 data bus 901, at step 2051. (This step corresponds to step 1810 of FIG. 18.) Its job is completed, and microprocessor 905 returns to its other activities, at step 2052.

Based on its routing vector 1110, the message is received by packet switcher 921 of the very same SNB 501, while peer SNBs 501 ignore it. And based on its routing vector 1110, the message is sent to FIFO buffer 943 for insertion into the outgoing data stream on TDM link 102 or 602.

From the above description, it will be seen that the circuit-path setup message carries a specification of the time slot used by the call path on TDM link 102 or 602 entering each NSN 401 as well as a specification of the SNB 501 of each NSN 401 from which the call path will be exiting. It is the responsibility of each NSN 401 to choose an available outgoing time slot and make a connection between the specified incoming time slot and the chosen outgoing time slot. At each NSN 401, the incoming time slot specification in the circuit-path setup message is overwritten to specify the outgoing time slot, which becomes the next NSN's 401 incoming time slot. This process continues as the circuit-path setup message is passed along from NSN 401 to NSN 401, until the message reaches the destination SPE 104.

The above-described procedures are repeated and the circuit-path setup message continues to be processed by successive NSNs 401 in the same manner, until the circuit-path setup message is received by CSI 212 of call-originating switch module 201. Based on routing vector 1110, packet switcher 221 sends the message to PKT bus 202. Based on bus address 1111, SPE 104 of originating switch module 201 receives the message. And based on link I.D. field 1113, SPE 104 recognizes the message as a control network message.

SPE 104 responds to receipt and recognition of the circuit-path setup message by establishing the requisite connections within originating switch module 201. Inter alia, SPE 104 sends a message to CSI 212 of originating switch module 201, through their TDM bus 103 control communication channel, to cause microprocessor 220 to program control RAM 245 such that it will cause TDM bus interface 227 to connect TDM link 102 time slot specified by time slot field 1121 of the received setup message to a TDM bus 103 time slot selected by SPE 104 for the originating port 106 or 206.

SPE 104 then undertakes activities to set up a circuit-call path for the call in the other direction, from originating switch module 201 to destination module 201. This forward path may in general be a different path (i.e., following a route through different network elements) than the already-established return path. These activities duplicate those described above for SPE 104 of destination switch module 201, including the formulation and sending of a circuit-path setup message through the control network, thereby completing the duplex circuit call-path setup through the network of FIG. 7.

When SPE 104 of destination switch module 201 detects that the destination port 106 or 206 has "answered", it sends a packet through the self-routing packet network to SPE 104 of originating switch module 201 to notify it thereof. The circuit-switched call now proceeds across the duplex path that has been set up for it.

Conference calls are achieved by delivering talk samples from each switch module 201 having a party in the call to every other switch module 201 having a party in the call. This is accomplished by having talk paths that go from one switch module 201 to more than one other switch module 201 be split within CSN 400. When an SPE 104 adds a port 106 or 206 to a call that has parties on multiple switch modules 201, it establishes talk paths to each of those other switch modules. Each of these connections is established via a different circuit-path setup message. If the multiple connection paths used to specify those talk paths have common leading elements, then common time slots and connections may be used for all those connections that share the common path segment. (See discussion of steps 2018, 2019, and 2025 of FIG. 20.) At the NSN 401 entry SNB 501 where the paths diverge, a single incoming time slot is shared between two connections that go to different places.

Failure of a circuit-path setup attempt is handled as follows. If at some point along the prescribed connection path of a circuit-path setup message, an SNB 501 is unable to make a connection (e.g., blocking) or to forward the circuit-path setup message (e.g., failed link), the SNB 501 uses return route field 1123 to send a circuit-path fail message back to the originating SPE 104, indicating the location and the reason for the blockage or failure. As the circuit-path fail message is routed back toward the originating SPE 104, it is processed at step 2031 of FIG. 20 at each SNB 501 along the return route, thereby tearing down the previously-established connection in each NSN 401. When the originating SPE 104 receives the circuit-path fail message, no partial connection remains that must be cleaned up. SPE 104 can then re-attempt to establish the needed circuit-switched connection over an alternate route, by injecting another circuit-path setup message into the control network.

Circuit-switch connections through CSN 400 are normally torn down in the forward direction by SPE 104 that initiated the setup. (Connections can also be torn down in the reverse direction, although this is only expected to be done during recovery operations). When one of the ports 106 or 206 involved in the call terminates the call (e.g., goes on-hook), SPE 104 of the switching module 201 local to that port 106 or 206 detects the termination, and sends a message across the self-routing packet network to the other switching module(s) 201 involved in the call to notify it (them) thereof. SPEs 104 of the two switching modules 201 involved in the call then send control messages to their corresponding CSIs 212 to cause them to disconnect the call's TDM bus 103 time slot from the call's TDM link 102 time slot, and inject circuit-path release control messages into the control network to cause the call path that had been set up for the call through the system of FIG. 7 to be torn down. The circuit-path release messages duplicate the above-described circuit-path setup messages, but carry a CP_RELEASE opcode in opcode field 1116.

The circuit-path release message specifies the incoming time slot on the access link 102 or 602 to an NSN 401 and the connection path that was used in setting up the connection. The circuit-path release message is injected into the control network and is received by the entry SNB 501 in the first NSN 401, at step 2000 of FIG. 20, and is processed there in the manner described for a circuit-path setup message, at steps 2001-2005. At step 2005, microprocessor 905 of the receiving SNB 501 determines that this is not a setup message, and so checks, at step 2030, whether it is a release message. If not, microprocessor 905 checks for other message types and processes them accordingly, at step 2031. But in this example, microprocessor 905 determines at step 2030 that this is a circuit-path release message. Microprocessor 905 then checks whether the message was received from a peer or from a neighbor, at step 2032. (This step corresponds to step 1801 of FIG. 18). If the message is determined to have been received from a neighbor, microprocessor 905 proceeds to steps 2011 et seq. to forward the message to the designated peer. If the message is determined to have been received from a peer, microprocessor 905 determines from which peer SNB 501 it had received the message, at step 2033. Next, microprocessor 905 rearranges route fields 1122 and 1123 to reflect the fact that its SNB 501 has already received the message, at steps 2034 and 2035. (These steps correspond to steps 1804 and 1805 of FIG. 18.) Microprocessor 905 then searches control RAM 942 to find the entry thereof that contains the I.D. of the source SNB identified at step 2033 and the call's incoming time slot identified by field 1121 of the received message, at step 2040. Upon finding the entry, microprocessor 905 decrements its corresponding connection count, at step 2041, and then checks whether the count is 0, at step 2042. If the count is zero, it means that the outgoing time slot associated with the control RAM entry is not carrying any other connections, and so microprocessor 905 clears the control RAM 942 entry to tear down the corresponding connection, at step 2043. Microprocessor 905 then proceeds to steps 2050 et seq. But if the count is not zero, it means that the outgoing time slot associated with the control RAM entry is carrying other connections, and so the entry may not be cleared. Microprocessor 905 therefore proceeds to steps 2050 et seq.

As described above, at steps 2050 et seq. the outgoing time slot is identified in the message and the message is forwarded across TDM link 102 or 602 to the neighbor element.

If some error occurs, e.g., a down link or no connection exists, the message can be returned to the originating SPE 104 using the reverse route field 1123. If this happens, CSN 400 may be left with a partial connection from some point within CSN 400 to the destination port network 106 or 206. This partial connection can be torn down with a control network message from an SPE 104 at the far end of the connection.

The circuit-path setup and release procedure is somewhat more complex in a system wherein switching modules 201 do not each have an SPE 104. Considering an illustrative example, assume a call originating at one switching module 201 and destined for another switching module 201 neither one of which has an SPE 104 but both of which are operating under control of an SPE 104 of a third switching module 201. Microprocessor 220 of CSI 212 is acting in place of an "archangel" of an SPE 104 (see the *AT&T Technical Journal* issue identified above) in the originating switch module 201. The call origination is detected by microprocessor 220 of CSI 212 of originating switch module 201. Microprocessor 220 responds by forming a packet that contains a message such as would be given by an "archangel" to its SPE, and sends it through packet inserter 222 via the self-routing packet network to SPE 104 of the third switching module 201.

SPE 104 responds to the packet by proceeding to set up a call path for the call. It selects an idle time slot for the call on TDM link 102 outgoing from originating switching module 201, and selects another idle time slot for the call on TDM link 102 outgoing from destination switching module 201. SPE 104 then forms messages equivalent to the messages that SPEs 104 of originating and destination switch modules 201 would send to their CSIs 212 as part of the circuit-path setup process, but sends them via the self-routing packet network, addressed to the remote CSIs 212. The remote CSIs 212 each receive the packet via the self-routing packet network and respond thereto as if it were a control message sent by a local SPE 104.

In like manner, SPE 104 forms circuit-path setup packets equivalent to the circuit-path setup packets that SPEs 104 of originating and destination switch modules 201 would form for injection into the control network as part of the circuit-path setup process, but sends these packets via the self-routing packet network, addressed to the PKT buses 202 but with the bus address 1111 specifying CSI 212 as the destination on the PKT buses 202. Again, each CSI 212 transmits the received packet on the connected PKT bus 202 and immediately proceeds to receive it back from PKT bus 202 and inject it into the control network as if it were a circuit-path setup packet sent by a local SPE 104. The circuit-path setup messages then propagate through the network and establish the requisite call path in exactly the manner that was described above.

Call termination is detected by a CSI 212 just like call origination, and SPE 104 of the third switch node 201 is notified in like manner. SPE 104 then sends out circuit-path release packets in the same manner as it had sent out the circuit-path setup packets.

Of course, it should be understood that various changes and modifications to the illustrative embodiment described above will be apparent to those skilled in the art. For example, a call may occupy more than one frame time slot, and hence circuit-path setup and release messages may specify more than one time slot in time slot field 1121. Such changes and modifications can be made without departing from the spirit and the scope of the invention and without diminishing its attendant advantages. It is therefore intended that all such changes and modifications be covered by the following claims.

We claim:

1. A circuit- and packet-switching unit of a switching node for a switching system having one or more communication switching nodes each including a plurality of circuit- and packet-switching units comprising:

means connectable to either one of a communication endpoint or a unit of another switching node, for receiving simultaneously a plurality of multiplexed circuit- and packet-switched communications in a same format from a connected either one of the endpoint or the unit of the other switching node;

means connectable to the units of the switching node that includes the unit, for broadcasting all communications received by the receiving means to each unit within the switching node;

means connectable to the units of the switching node that includes the unit and responsive to receipt of communications broadcast by the units of the switching node that includes the unit, for determining which of the received broadcast communications are destined for receipt or transmission by the unit and discarding all other received broadcast communications;

means responsive to information included in received broadcast communications that are destined for receipt by the unit, for multiplexing together received broadcast circuit- and packet-switched communications that are received from a plurality of the units of the switching node that includes the unit and are destined for transmission by the unit; and means connectable to either one of a communication endpoint or a unit of another switching node, for transmitting simultaneously a plurality of circuit- and packet-switched communications multiplexed together by the multiplexing means in the same format to a connected either one of the endpoint or the unit of the other switching node.

2. The unit of claim 1 wherein the determining means includes a plurality of means, a different one connectable to each unit of the node that includes the unit, each for receiving and storing communications broadcast by the connected unit; and wherein the multiplexing means is for multiplexing together circuit- and packet-switched communications that are stored by a plurality of the receiving and storing means and intended for transmission by the unit.

3. The unit of claim 1 wherein the determining means further includes:

means for determining whether an individual received packet-switched communication is destined for receipt or transmission by the unit from an address included in the individual packet-switched communication; and means for determining whether an individual received circuit-switched communication is destined for transmission by the unit from information included in a packet-switched communication destined for receipt by the unit, and received by the unit prior to the individual circuit-switched communication.

4. The unit of claim 1 wherein the format is a multiplexed format wherein a bandwidth is divided into a plurality of identifiable portions and wherein each communication occupies a different identifiable portion of the bandwidth; and wherein the determining means includes:

first means for determining whether an individual received packet-switched communication is destined for receipt or transmission by the unit from an address included in the individual packet-switched communication; and second means for determining whether an individual circuit-switched communication is destined for transmission by the unit from the portion of a link's bandwidth that is occupied by the communication.

5. The unit of claim 4 wherein the second means further includes third means responsive to a packet-switched communication addressed to the unit and received by the unit prior to an individual circuit-switched communication, for storing information included in the received packet-switched communication that identifies the portion of a link's bandwidth that will be occupied by the individual circuit-switched communication.

6. The unit of claim 5 wherein the third means further store information that identifies the portion of the bandwidth of the unit's connected link that is to be occupied by the individual circuit-switched communication; and wherein the transmitting means includes bandwidth-portion interchange means for transmitting the individual circuit-switched communication in the connected link's bandwidth portion specified by the information stored by the third means.

7. The unit of claim 2 wherein the format is time-division multiplexed format having different selected time slots carrying different circuit-switched communications and having other time slots carrying packet-switched communications; wherein each receiving and storing means of the determining means comprises means for deciding whether an individual received broadcast communication is packet-switched or circuit-switched; wherein the determining means comprises means for determining from addressing information included in packet-switched communications which of the stored packet-switched communications are intended for receipt or transmission by the unit and discarding all other stored packet-switched communications; and wherein the multiplexing means comprises time-slot-interchanging means responsive to information included in stored packet-switched communications that are intended for receipt by the unit, for placing selected circuit-switched communications stored by a plurality of the receiving and storing means into selected time slots of the time-division multiplexed format transmitted by the transmitting means and discarding other stored circuit-switched communications, and for placing packet-switched communications stored by the plurality of the receiving and storing means that are intended for transmission by the unit into other time slots of the time-division multiplexed format transmitted by the transmitting means.

8. The unit of claim 7 wherein
the broadcasting means include means for broadcasting all communications received by the receiving means to each unit within the switching node in the same format in which the communications are received.

9. A circuit and packet switching system comprising:
a plurality of interconnected identical switching units forming one or more communication switching nodes, each switching node including
a plurality of different ones of the identical switching units, and
a communication medium interconnecting all of the units of the switching node; each unit comprising
means connectable to either one of a communication endpoint or a unit of another switching node, for receiving simultaneously a plurality of multiplexed circuit- and packet-switched communications in a same format from a connected either one of the endpoint or the unit of the other switching node;
means connectable to the units of the switching node that includes the unit, for broadcasting all communications received by the receiving means to each unit within the switching node;
means connectable to the units of the switching node that includes the unit and responsive to receipt of communications broadcast by the units of the switching node that includes the unit, for determining which of the received broadcast communications are intended for receipt or transmission by the unit and discarding all other received broadcast communications;
means responsive to information included in received broadcast communications that are intended for receipt by the unit, for multiplexing together received broadcast circuit- and packet-switched communications that are received from a plurality of the units of the switching node that includes the unit and are intended for transmission by the unit; and
means connectable to either one of a communication endpoint or a unit of another switching node, for transmitting simultaneously a plurality of circuit- and packet-switched communications multiplexed together by the multiplexing means in the same format to a connected either one of the endpoint or the unit of the other switching node.

10. The system of claim 9 wherein
the determining means includes a plurality of means, a different one connectable to each unit of the node that includes the unit, each for receiving and storing communications broadcast by the connected unit; and wherein
the multiplexing means is for multiplexing together circuit- and packet-switched communications that are stored by a plurality of the receiving and storing means and intended for transmission by the unit.

11. The system of claim 9 wherein the plurality of interconnected identical switching units form a plurality of communication switching nodes each comprising a plurality of different ones of the units, and wherein
the system further includes
at least one communication link interconnecting the plurality of switching nodes and each having an identical communication format, at least one unit of each switching node each being connected by one of the communication links to a unit of another switching node, to form a hierarchical circuit and packet switch.

12. A circuit- and packet-switching network comprising:
a plurality of interconnected identical switching units forming one or more communication switching nodes, each switching node including
a plurality of different ones of the identical switching units, and
a communication medium interconnecting all of the units of the switching node;
a plurality of communication endpoints each connected to the one or more switching nodes for at least one of transmitting communications to others of the endpoints or receiving communications from others of the endpoints through at least one of the one or more switching nodes; and
a plurality of communication links each connecting a different one of the units of a switching node to either (a) one of the communication endpoints or (b) a unit of another switching node, all of the links having an identical communication format;
each unit comprising
means connectable to either one of a communication endpoint or a unit of another switching node, for receiving simultaneously a plurality of multiplexed circuit- and packet-switched communications in a same format from a connected either one of the endpoint or the unit of the other switching node;
means connectable to the units of the switching node that includes the unit, for broadcasting all communications received by the receiving means to each unit within the switching node;
means connectable to the units of the switching node that includes the unit and responsive to receipt of communications broadcast by the units of the switching node that includes the unit, for determining which of the received broadcast communications are intended for receipt or retransmission by the unit and discarding all other received broadcast communications;
means responsive to information included in received broadcast communications that are intended for receipt by the unit, for multiplexing together received broadcast circuit- and packet-switched communications that are received from a plurality of the units of the switching node that includes the unit and are intended for retransmission by the unit; and
means connectable to either one of a communication endpoint or a unit of another switching node, for transmitting simultaneously a plurality of circuit- and packet-switched communications multiplexed together by the multiplexing means in the same format to a connected either one of the endpoint or the unit of the other switching node.

13. The network of claim 12 wherein the determining means includes a plurality of means, a different one connectable to each unit of the node that includes the unit, each for receiving and storing communications broadcast by the connected unit; and wherein the multiplexing means is for multiplexing together circuit- and packet-switched communications that are stored by a plurality of the receiving and storing means and intended for retransmission by the unit.

14. The network of claim 12 wherein the units have no information on routing of communications through the system other than the information to which the multiplexing means responds, and wherein the information to which the multiplexing means responds is provided to the units by the endpoints.

* * * * *